(12) United States Patent
Gremmert et al.

(10) Patent No.: US 6,584,384 B2
(45) Date of Patent: Jun. 24, 2003

(54) DEVICE, METHOD AND COMPUTER PROGRAM PRODUCT FOR ALTIMETRY SYSTEM

(75) Inventors: Scott Gremmert, Redmond, WA (US); Steven C. Johnson, Issaquah, WA (US); Glen Burlingame, Redmond, WA (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 09/783,575

(22) Filed: Feb. 2, 2001

(65) Prior Publication Data

US 2001/0047230 A1 Nov. 29, 2001

Related U.S. Application Data

(60) Provisional application No. 60/180,629, filed on Feb. 3, 2000.

(51) Int. Cl.[7] .......................... G06F 17/00; G08B 23/00
(52) U.S. Cl. .................. 701/4; 701/4; 701/301; 340/961; 340/963; 340/945; 340/977; 342/462
(58) Field of Search ............................ 701/4, 300, 301, 701/200, 307, 317, 302; 340/945, 961, 963, 120, 63, 29, 970, 976, 972, 977, 462; 244/180

(56) References Cited

U.S. PATENT DOCUMENTS

| | | | | |
|---|---|---|---|---|
| 4,882,697 A | * | 11/1989 | Ross | 340/970 |
| 5,160,933 A | * | 11/1992 | Hager | 342/174 |
| 5,210,540 A | * | 5/1993 | Masumoto | 342/357 |
| 5,265,025 A | * | 11/1993 | Hirata | 342/450 |
| 5,415,031 A | * | 5/1995 | Colleu et al. | 73/178 R |
| 5,585,791 A | | 12/1996 | Paterson et al. | 340/970 |
| 6,020,832 A | | 2/2000 | Jensen | 340/970 |
| 6,154,151 A | * | 11/2000 | McElreath et al. | 340/970 |
| 6,157,891 A | * | 12/2000 | Lin | 701/301 |
| 6,216,064 B1 | * | 4/2001 | Johnson et al. | 701/4 |
| 6,259,380 B1 | * | 7/2001 | Jensen | 340/970 |
| 6,275,172 B1 | * | 8/2001 | Curtis et al. | 340/961 |
| 6,281,832 B1 | * | 8/2001 | McElreath | 342/65 |

FOREIGN PATENT DOCUMENTS

WO    WO 99 42788 A    8/1999 ............ G01C/5/00

OTHER PUBLICATIONS

Carley, "Flawed Safety Device in Jets Causes a Near Miss," *Wall Street Journal Interactive Edition*, Oct. 20, 1999.
Federal Aviation Administration, DOT, "Airworthiness Directives; Various Transport Category Airplanes Equipped with Mode "C" Transponder(s) with Single Gillham Code Altitude Input," Apr. 20, 2000.
Internet Web Page http://www.findarticles.com/m0CWU/1999_16/57597647/pl/article.jhtml, "The US FAA proposes new airworthiness directives," Nov. 16, 1999.
Internet Web Page http://www.eurocontrol.be/projects/eatchip/mode$_{13}$ s/modes_prog/airborne.html, "Mode S Airborne Aspects."
Internet Web Page http://www.sandiaaerospace.com/products/sae5-35.html, "Innovation in the Sandia Aerospace Tradition."
Cundy and Brown, "Introduction to Avionics," pp. 85–107, 1997.

* cited by examiner

Primary Examiner—Thomas G. Black
Assistant Examiner—Tuan C To
(74) Attorney, Agent, or Firm—Honeywell International Inc.

(57) ABSTRACT

An apparatus, system, method and computer program product to verify proper operation of an aircraft altimetry system. Aural and visual alerts may optionally be provided when a fault in the altimetry is detected.

76 Claims, 9 Drawing Sheets

DEVICE, METHOD AND COMPUTER PROGRAM PRODUCT FOR ALTIMETRY SYSTEM

CROSS-REFERENCES TO RELATED APPLICATIONS

This application claims priority from U.S. Provisional Application No. 60/180,629 filed Feb. 3, 2000 titled: "Gillham Altitude Monitoring Algorithm." which is incorporated herein by reference for all purposes. This application is additionally related to U.S. application Ser. No. 09/255,670, which is now U.S. Pat. No. 6,216,064, filed Feb. 23, 1999 and titled: "Method and Apparatus for Determining Altitude" which is also hereby incorporated by reference.

BACKGROUND OF THE INVENTION

This invention relates to altimetry systems for aircraft and more particularly to encoding of altimetry data.

All aircraft carry an altimeter to sense aircraft altitude. In most modern aircraft, such equipment includes an encoding altimeter; a barometric altimeter coupled to an altimeter digitizer; and/or an air data computer. The altimetry data output from such devices is digitally encoded for use by other aircraft systems, including, for example: the aircraft transponder; traffic collision and avoidance system (TCAS); ground proximity warning systems (GPWS and EGPWS); flight data recorders; various navigation systems; and in some cases a cockpit display of pressure altitude.

Digital representation of the altimetry data is electronically accomplished through the use of Gray code. Unlike other number systems, in which more than one bit may change when the measured parameter increments in value, the Gray code is a number system designed such that only one bit changes at a time. For example, in the system of counting numbers, a change in value from 79 to 80 changes both the "7" to an "8" and the "9" to a "0." Simultaneously changing the value of more than one bit increases the probability of an error in the encoding process. Such errors are reduced through the use of the Gray code. A particular form of Gray code, called Gillham code, is used in aviation to encode the altimetry data. Table 1 lists the Gillham code.

Errors in altimetry can also occur due to a blocked static port. Barometric altimeters sense changes in ambient air pressure and correlate these pressure changes to changes in altitude. Blockage of the static port disrupts the altimeter's source of pressure data, thereby introducing altimetry errors. Additional errors can also arise when the altitude sensing equipment has a fault that causes the data, or a bit in the digital representation of the data, to freeze at a certain value. Errors may also occur due to an altimeter malfunction that results in a completely erroneous determination of altitude.

Any errors in the altitude data used by aircraft systems may lead to hazardous conditions or catastrophic accidents. Air traffic controllers often maintain aircraft separation through use of vertical spacing. Without accurate altitude data as relayed by the aircraft transponder, the controller cannot be assured that aircraft are separated vertically. The TCAS system is a safety device that also seeks to prevent inadvertent collisions between aircraft by exchanging altitude data between aircraft in close proximity. Errors in the altitude data used by this system may exacerbate rather than mitigate the risk of collision.

Aircraft systems therefore utilize various systems to verify the accuracy of the altitude data. In many cases, a redundant altitude data source/computing system is used to independently calculate the altitude information. In the event the two calculations do not agree, this information is used to indicate a system fault. Use of redundant computations, however, slows processing time and increases the overall system cost through use of duplicative circuits and components. Furthermore, this redundancy reduces but does not necessarily eliminate errors. For example, a scenario can occur where neither altimeter calculation appears to be obviously in error, yet neither is in agreement with the other.

To reduce the expense associated with a completely duplicative system, in many aircraft configurations, a single Gillham encoder is used to encode the altimetry data, or a single source of raw altimetry data is provided to the redundant computing systems for encoding. Thus, if the single encoder or single raw data source suffers a fault, even the redundant computing systems may not detect the error. A Wall Street Journal article titled "Flawed Safety Device in Jets Causes a Near Miss," published Oct. 20, 1999 documents one example of this latter type of failure.

Alternative means of measuring altitude do not completely solve the above identified problems. Use of radio altimetry measures height above ground and unlike pressure altitude data or data referenced to sea level, does not provide information relative to a reference in use among all participating aircraft. Use of satellite based navigation tools such as the global positioning system, GPS, provide only a partial solution. Reliable GPS navigation requires that a minimum number of operational satellites be visible. In addition, errors in GPS computed position have their greatest magnitude in the calculation of altitude.

SUMMARY OF THE INVENTION

The present invention provides a system, apparatus, method and computer program product for enhancing the robustness of altimetry data using Gillham, or other Grey code encoding. In addition, the present invention provides a system, apparatus, method and computer program product for verifying the reasonableness of aircraft altimetry data and may optionally include an alert when the altimetry appears suspect.

According to one aspect of the invention, the invention compares two independent sources of altitude data to obtain two independent measures of altitude rate. In a preferred embodiment, the invention compares inputs from both the pneumatic altimetry data and the global positioning (GPS) altitude data. The altitude rate of change between the two sources is then compared and if the two values are not within a specified tolerance, a possible fault in the altimetry is indicated. The system faults detected by this aspect of the invention thus include a blocked static port, or "stuck" altitude source or encoder.

According to another aspect of the present invention, the invention verifies that the measure of pressure altitude as indicated by the altimetry system is a reasonable value. In a preferred embodiment, pressure altitude is compared with geometric altitude provided by an independent source, such as for example, GPS. An error budget is established to account for errors due to, for example, the known difference between pressure altitude and geometric altitude in the standard atmosphere, errors in GPS position measurement and deviations from standard atmospheric conditions. If the pressure altitude differs from the geometric altitude by an amount greater than this error budget, a possible fault is likely in the pressure altitude sensing/reporting system.

According to yet another embodiment of the present invention, the Gillham code is itself checked for errors. In one embodiment of the invention, the current Gillham value is compared to the last sampled Gillham value to ascertain if the Gillham bits have toggled between samples in an invalid sequence. The invention additionally checks for invalid bit values in certain code positions. The present invention is thus able to detect a fault in the Gillham logic such as a broken encoder, a stuck bit or faulty wiring connection.

According to another aspect of the invention, the invention alerts the cockpit crew of discrepancies in the altimetry data. The invention may also be used to signal other aircraft systems that the altimetry data is suspect. Systems requiring such data may then elect to disregard or otherwise process the altimetry data in accordance with the criticality of altitude data to the operation of that system.

Further features and advantages of the present invention will be described in greater detail below with reference to the drawings.

DETAILED DESCRIPTION OF THE PREFERRED EMBODIMENTS

The present invention provides a system, method, apparatus and computer program product for detecting possible faults in the altimetry sensing and reporting systems, and is particularly useful for aircraft.

System Overview

Figure 1:
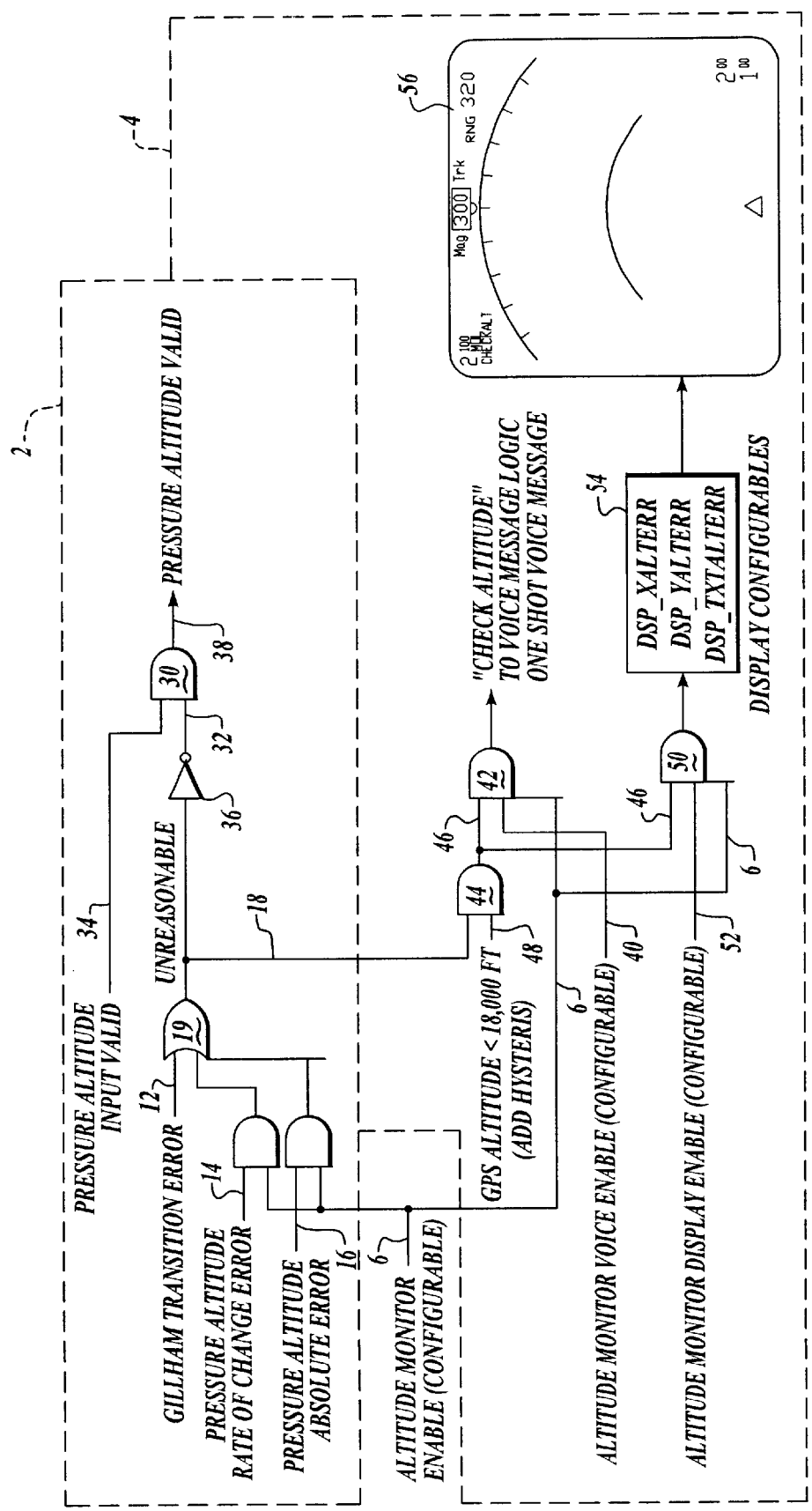
FIG. 1 is a top level diagram illustrating operation of the present invention.

FIG. 1 is top level diagram illustrating operation of a preferred embodiment of the present invention. A first portion 2 of FIG. 1 includes logic that asserts a signal when a probable error is detected in the altimetry data operations. According to a preferred embodiment of the invention, FIG. 1 optionally includes a second portion 4 that includes logic to drive an aural and/or visual alert. The alerting and annunciating functions of the present invention are optionally activated by the aircraft operator or flight crew via a signal 6. Altitude monitor enable signal 6 may comprise a cockpit switch or a pin enable that is activated at time of installation.

When the altitude monitor of the present invention is enabled by signal 6, the present invention asserts a signal if a possible error is detected in either the Gillham code transition, the pressure altitude rate of change, or in the pressure altitude measurement. According to one possible embodiment of the present invention, three independent logic circuits, to be described in detail below, ascertain if an error is possible in the Gillham code transition, the altitude rate of change and the pressure altitude measurement respectively. If any of these logic circuits detect a possible error in the aforementioned parameters, the appropriate circuit asserts a signal on one of lines 12, 14 or 16. When the present invention is enabled by signal 6, the presence of an asserted signal on any of lines 12, 14 and 16 will cause the output 18 of logical OR 19 to be asserted, thereby indicating a possible fault in the altitude data supplied to the aircraft systems.

Logic circuit 2 further includes logic that outputs a signal to indicate that the altimetry data appears valid. Logical AND function 30 receives the inverted output 32 of OR function 19, and the pressure altitude input valid signal 34. Pressure altitude input valid signal 34 comprises a signal currently available on the aircraft and output by the encoding altimeter, air data computer, or altitude digitizer as appropriate that indicates that the respective equipment is powered on and has satisfactorily performed all self checks. Signal 32 comprises the output of inverter 36, which inverts signal 18 output from OR function 19. Signal 32 is asserted whenever each of signals 12, 14 and 16 are deasserted and thus when asserted signal 32 indicates that no fault has been detected in the altimetry. When both signals 32 and 34 are asserted, the pressure altitude output by the altimetry system is therefore presumed valid, and AND function 30 asserts a pressure altitude valid signal 38. Signal 38 is subsequently supplied to those aircraft systems that utilize altimetry in their operations. These systems can be programmed to cease operations requiring the altimetry, to otherwise process the altimetry or to execute some other action as appropriate to the task performed by that system.

In a preferred embodiment of the invention, signal 18 may be additionally coupled to annunciation circuit 4. When signal 18 is asserted, annunciation circuit 4 provides notification to the crew of a possible altitude data fault. The annunciation may be either aural and/or visual and is preferably user configurable. In the embodiment of FIG. 1, the aural annunciation circuit includes an enable signal 40 which is input to a logical AND function 42. Also coupled to AND gate 42 is the output 44 of an AND function 46. AND gate 44 receives signal 18 and a second signal, 48 that indicates whether the aircraft is below 18,000 feet. According to the embodiment of FIG. 1, when the aircraft is both below 18,000 feet and an altimetry fault is indicated by signal 18 of circuit 2, the output 48 of AND gate 44 is asserted thereby activating annunciation of the altimetry fault.

The use of AND gate 44 and signal 48 comprises an optional portion of the invention. The floor of class A controlled airspace begins at 18,000 feet. All aircraft in class A airspace must be on an instrument flight plan and carry certain specified equipment. Aircraft in class A airspace also set their altimeter reference to 29.92 inches of mercury regardless of the actual sea level pressure. Typically, general aviation aircraft do not fly at or above this altitude. For this reason, in certain general aviation aircraft applications, it may be desirable to enable the annunciation circuit only when the on board navigation systems indicate that the aircraft is below 18,000 feet. In the embodiment shown, this information is provided from the aircraft global positioning system as signal 48. The comparison between the GPS altitude and the specified value of 18,000 feet may be modulated, or incorporate a hysteresis, to prevent oscillations about the 18,000 foot mark that alternatively activate and deactivate the annunciation system. Modulation in the manner described is well known to those of skill in the art.

In the embodiment of FIG. 1, the aural annunciation activates when circuit 2 asserts signal 18, the aircraft is below 18,000 feet, and both the altitude monitor enable and aural alert enable signals are asserted. The aural announcement may comprise, for example, the phrase "Check Altitude." or other acceptable voice alert stored in a WAV file or similar device as is known to those of skill in the art.

The AND gate 50 of FIG. 1 operates in a similar manner to AND gate 42 to activate a visual annunciation of a possible altitude data fault. As diagrammed in FIG. 2, AND gate 50 asserts a signal to activate the visual annunciation when circuit 2 asserts signal 18, the aircraft is below 18,000 feet, and both the altitude monitor enable signal 6 and the visual alert enable signal 52 are asserted. The visual alert may comprise a cockpit lamp or a graphical or textual alert appearing on a cockpit display. In FIG. 1, a set of user configurable values 54 are stored in a memory device or display driver. These configurable parameters identify placement of the visual annunciation on a display 56. The phrase "CHK ALT" appears in the upper left corner of example display 56. Other appropriate phraseology may be used. The visual annunciation may optionally comprise a graphical symbol.

Displays and display drivers suitable for use with the present invention are located throughout the flight deck and avionics subsystems. The flight management system (FMS), weather radar, Enhanced Ground Proximity Warning System (EGPWS), Traffic Collision and Avoidance System (TCAS), and cockpit navigation displays are examples of systems which contain hardware/software useful for driving an associated cockpit display. Techniques for driving these displays to display the alerting graphics and text of the present invention are well known to those of skill in the art.

Gillham Altitude Transition Error Detection Logic

Figure 2:
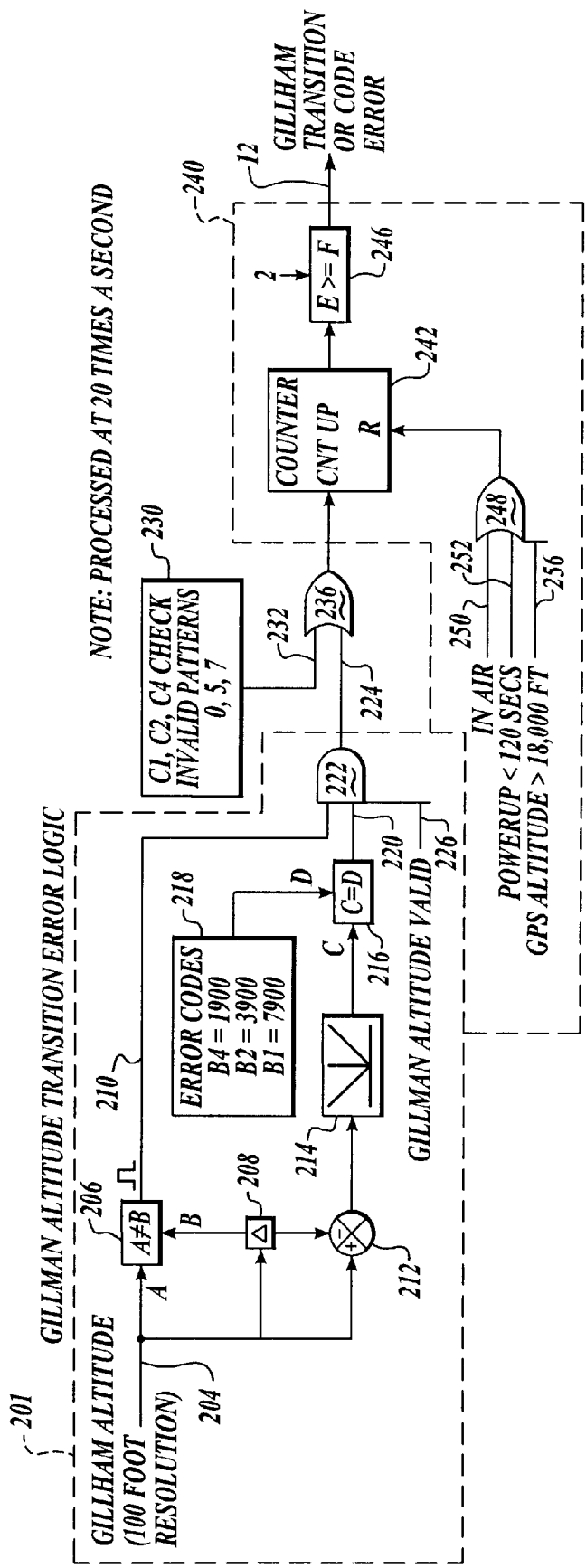
FIG. 2 is a transfer diagram for identifying an error in Gillham altitude transition according to a preferred embodiment of the present invention.

FIG. 2 contains a logic diagram illustrating a device and method for detecting errors in the Gillham altitude data and for asserting signal 12 of FIG. 1. Specifically, the logic of FIG. 2 can detect when there exists a stuck bit in the Gillham encoder, or a broken wire lead, or faulty connection in the circuits supplying the Gillham altitude data.

One subsection, 201, of FIG. 2 checks for stuck bits in the Gillham code. Region 201 of FIG. 3 receives the Gillham altitude value at input 204. A comparator 206 compares the current Gillham altitude, signal A, with the last Gillham altitude value, B, which has been retained in the 1 sample delay latch 208. For the condition when the current Gillham value, A, does not equal the previous value, B, stored in the latch, comparator 206 asserts a signal on line 210. Signal 210 when asserted indicates that the altitude as reported by the Gillham code has changed.

A junction 212 obtains the difference between the current value A and previous value B. The difference value output from junction 212 is provided to an absolute value function 214 that ensures the reported difference, C, between the current and previous samples is always greater than zero. A second comparator circuit 216 compares this difference to a set of predefined error codes 218. If the difference signal C equals one of the values D stored in table 218, one bit of the Gillham code is likely in error due to either a stuck bit or other fault in the system electrical connection. Specifically, a 7900 foot difference between the present altitude as represented by Gillham encoded signal A and the previously encoded altitude, B, indicates that bit B1 of the Gillham encoded altitude is in error. In a similar manner, a difference of 3900 feet indicates an error in bit B2 of the code and a 1900 foot difference indicates an error in bit B4 of the Gillham encoded altitude. When the difference signal C equals one of these error values, D; comparator 216 asserts an error signal 220.

When the current and previously reported Gillham altitude have changed as indicated by signal 218, and the difference between the codes indicates a bit error as indicated by error signal 220, a fault in the Gillham reported data is likely. A logical AND function 222 asserts a signal 224 when these conditions exist and the Gillham circuit is operational. A Gillham altitude valid signal 226 indicates the operational status of the Gillham encoding circuit. In a preferred embodiment of the invention, signal 226 comprises a signal output from the Gillham encoder that indicates the encoder is receiving power and has satisfactorily performed all of its self checks.

The logic of FIG. 2 also checks for invalid bit patterns in the Gillham code. Bits C1, C2 and C4 should not, when read in sequence, equal the binary representations of the Arabic numbers 0, 5, or 7. In other words, the combination of bits 000, 101, and 111 should not appear in bit positions C1, C2 and C4. Such a combination indicates an invalid Gillham encoded altitude has been output by the system. Block 230 of FIG. 2 reads these bit positions and asserts a signal 232 when these invalid bit patterns are detected.

When either an invalid bit pattern exists or circuit 201 indicates a stuck or faulty bit, logical OR function 236 asserts a signal indicating the presence of an error. The logic of FIG. 2 additionally includes, however, circuitry to minimize false alerts and ensure that an actual error has been detected. False alerts have been shown to reduce the likelihood that the crew will treat an actual alert as a true alert condition and thereby have the effect of counteracting the safety benefits the present invention. For this reason, region 240 of FIG. 2 includes a counter 242 and a comparator 246 that causes Gillham transition error signal 12 to be asserted only when an error condition is detected twice in sequence. In a preferred embodiment of the invention, the sample rate of FIG. 2 is 20 times per second. The exact sample rate chosen is not critical, but is preferably fast enough such that no more than a 100 foot increase in altitude is likely to occur in the sample period. A logical OR 248 may optionally be used to initialize or reset the counter. Logical OR function 248 resets counter 242 when the aircraft is airborne as indicated by INAIR signal 250, at powerup as indicated by POWERUP signal 252 or optionally when the aircraft altitude exceeds 18,000 feet as indicated by signal 256. Signal 250 may come from a weight on wheels sensor, a radio altitude signal indicating a predetermined height above ground, or an airspeed signal showing an airspeed in excess of a specified value.

Pressure Altitude Rate of Change Error Logic

Figure 3:
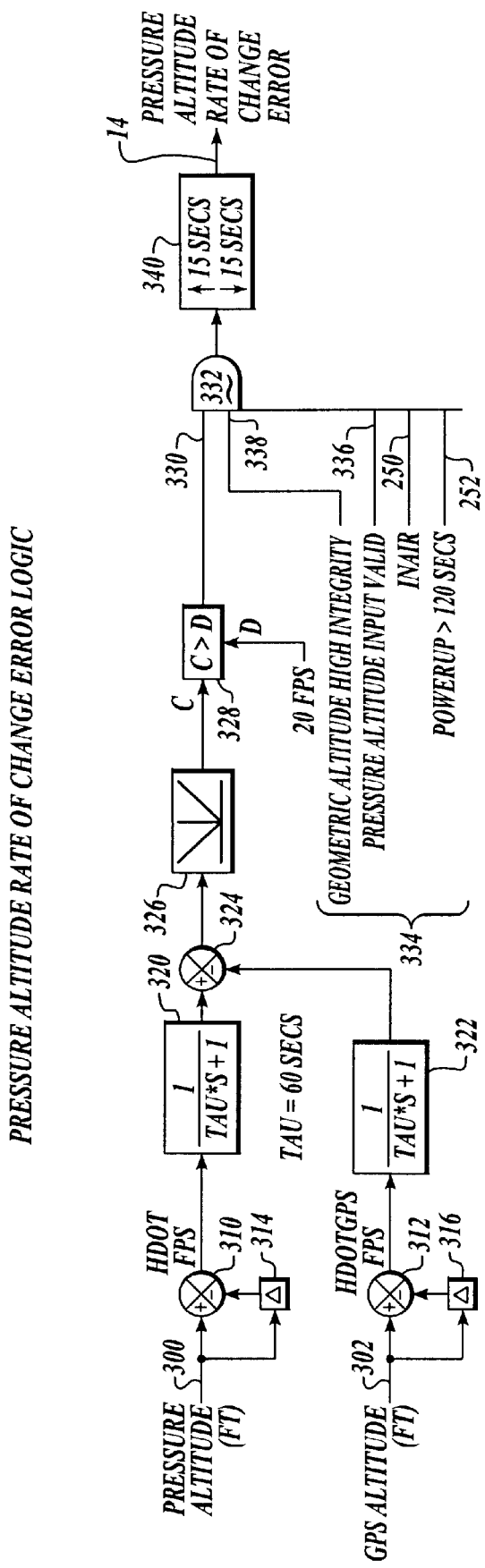
FIG. 3 is a transfer diagram for identifying an error in the rate of change in pressure altitude according to a preferred embodiment of the present invention.
Figure 5A:
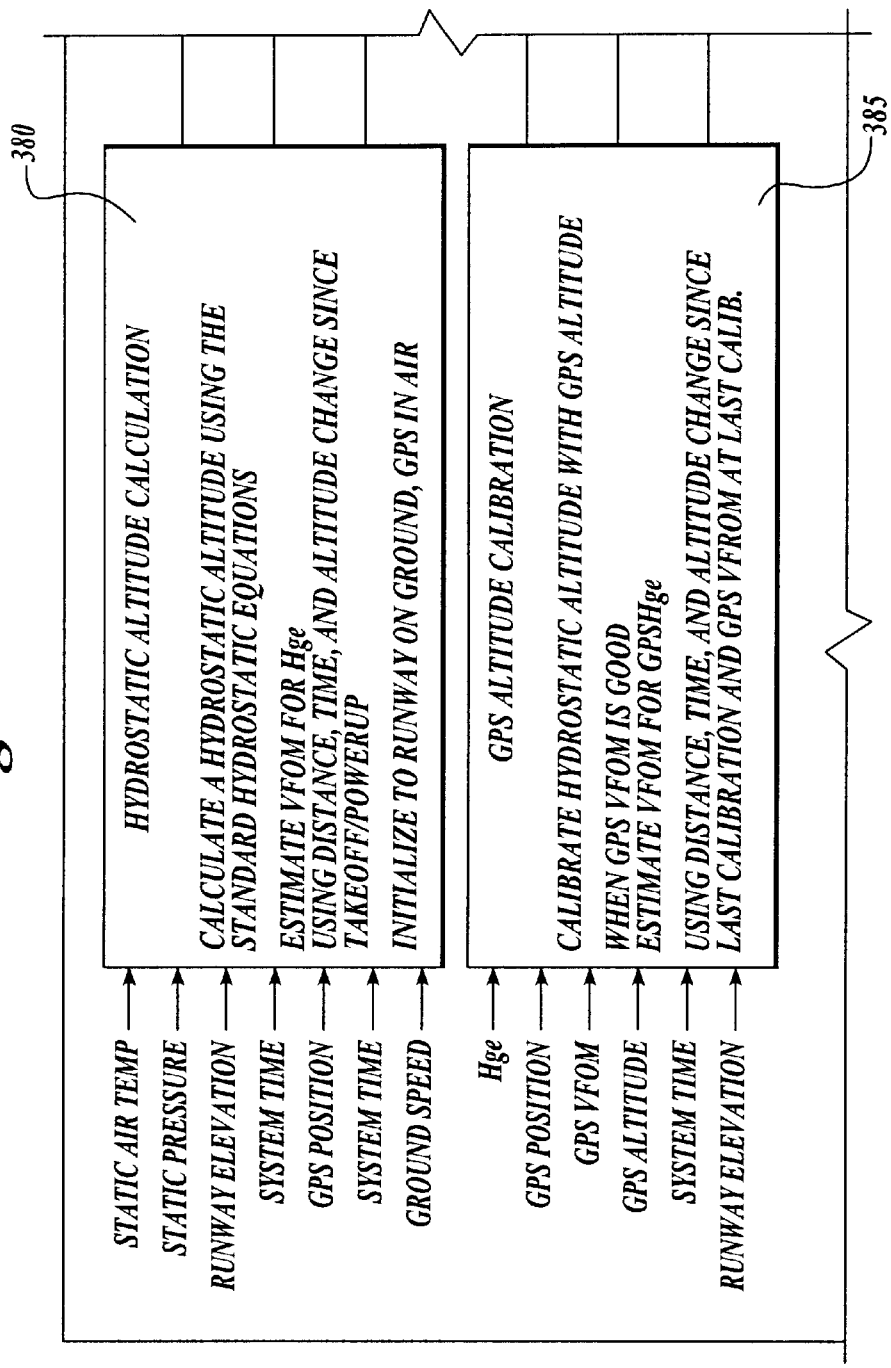
FIGS. 5A–5D are top level diagrams illustrating a device for obtaining a geometric altitude according to a preferred embodiment of the present invention.

FIG. 3 contains a logic diagram illustrating a device and method useful for detecting a condition in which changes in altitude are not reported. Such a condition can occur when the aircraft static port becomes blocked and/or the altitude encoder "freezes" and continues to output a single value.

In the diagram of FIG. 3, both the pressure altitude 300 as measured in feet and the geometric altitude 302 read from a global positioning unit or other non barometric altitude source are first processed by junctions 310 and 312, and sample and hold devices 314 and 316 respectively to obtain a change in altitude rate value. In a preferred embodiment of the invention, the altitude rates are represented as feet per second. These altitude rate values are then filtered by filters 320 and 322. Filters 320 and 322 introduce a lag into the altitude rate of change data to obtain a steady state value and to smooth out transient information. The specific time constant of 60 seconds chosen for filters 320 and 322 of FIG. 3 is but one of numerous possible values and the invention is not limited to the time constant as shown in FIG. 3.

The filtered rate of change information is compared at junction 324 and the absolute value of the difference between the two rates taken by function generator 326. If the absolute value of the difference, signal C, exceeds some predefined value, D, a comparator 328 asserts a signal 330 indicating a possible problem with the aircraft's altimetry. In the embodiment of FIG. 3, this predetermined value is shown as 20 feet per second, however, any value reasonably chosen to identify a significant discrepancy in the rate values obtained from the two sensors may be used. Preferably, this predetermined value also accounts for pneumatic lags in the collection of the barometric altitude data.

The logic of FIG. 3 also includes elements designed to prevent false alerts. The AND logic 332 only asserts a signal indicating an altitude rate of change error when various signals 334 indicate that the aircraft is airborne and the equipment used to sense altitude is operational. In FIG. 3, signals 334 include INAIR signal 250 and POWERUP signal 252 previously described. Signals 334 additionally include a Pressure Altitude Input Valid signal 336 and a Geometric Altitude High Integrity signal 338. Signals 336 and 338 are signals to indicate that the sensors used to sense altitude are functioning. Signal 336 may comprise a signal from, for example, the air data computer, or the encoding altimeter, that indicates that the system is powered and performed its self checks. Signal 338 is a signal to indicate integrity of the global positioning system altitude signal when a global positioning unit supplies altitude data to junction 312. Signal 338, however, may comprise any other appropriate signal to indicate that the associated sensor is active. Signal 338 may, for example, comprise a signal indicating the sensor is powered and performed self checks.

Geometric Altitude High Integrity signal 338 of the present embodiment, however, is obtained from a separate logic application designed to accurately fix geometric altitude using both barometric and global positioning system inputs. Such a system is fully described in copending U.S. application Ser. No. 09/255,670 titled: "Method and Apparatus for Determining Altitude," filed Feb. 23, 1999 and incorporated herein by reference. FIGS. 4 and 5A–5D collectively depict a block diagram of a geometric altitude measurement system.

The geometric altitude determination of FIGS. 4 and 5A–5D preferably uses a first altitude 380 based on hydrostatic calculations, including local pressure and temperature, as well as a second altitude 385 which is preferably a GPS altitude. Radio altimetry 387 can also be used instead of, or to complement the GPS altitude. Other sources of altitude data, for example barometric altitude data 390, can be used in the equation for the calculation of the final altitude when available. Each of the sources of altitude data is provided with an estimated error. In the final determination of the probable geometric altitude, each source of altitude data is weighted according to the estimated error of the altitude source. For global positioning altitude, the final combination of the altitude sources uses a complementary filter which takes into account the selective availability of the GPS altitude. This filter accounts for the long-term accuracy but short-term inaccuracy of GPS altitude. Corrections may be additionally provided to account for horizontal changes in pressure gradient as the aircraft moves through weather patterns between origin and destination as well as corrections based on non-standard atmospheric temperature variations.

Figure 4:
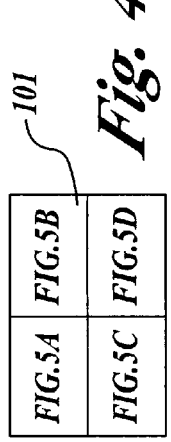
FIG. 4 is a chart illustrating the spatial relationship between FIGS. 5A–5D.
Figure 5B:
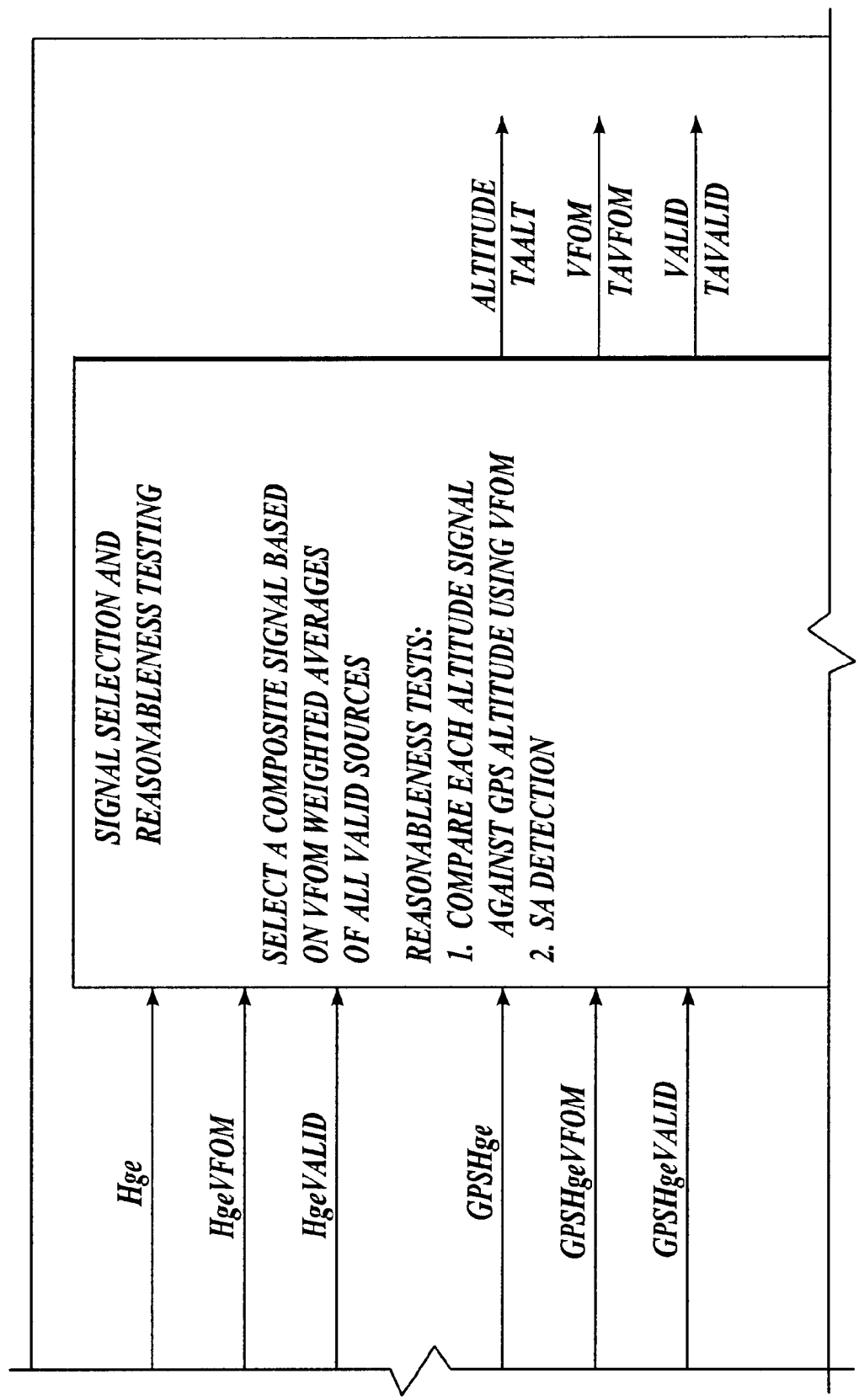
Figure 5C:
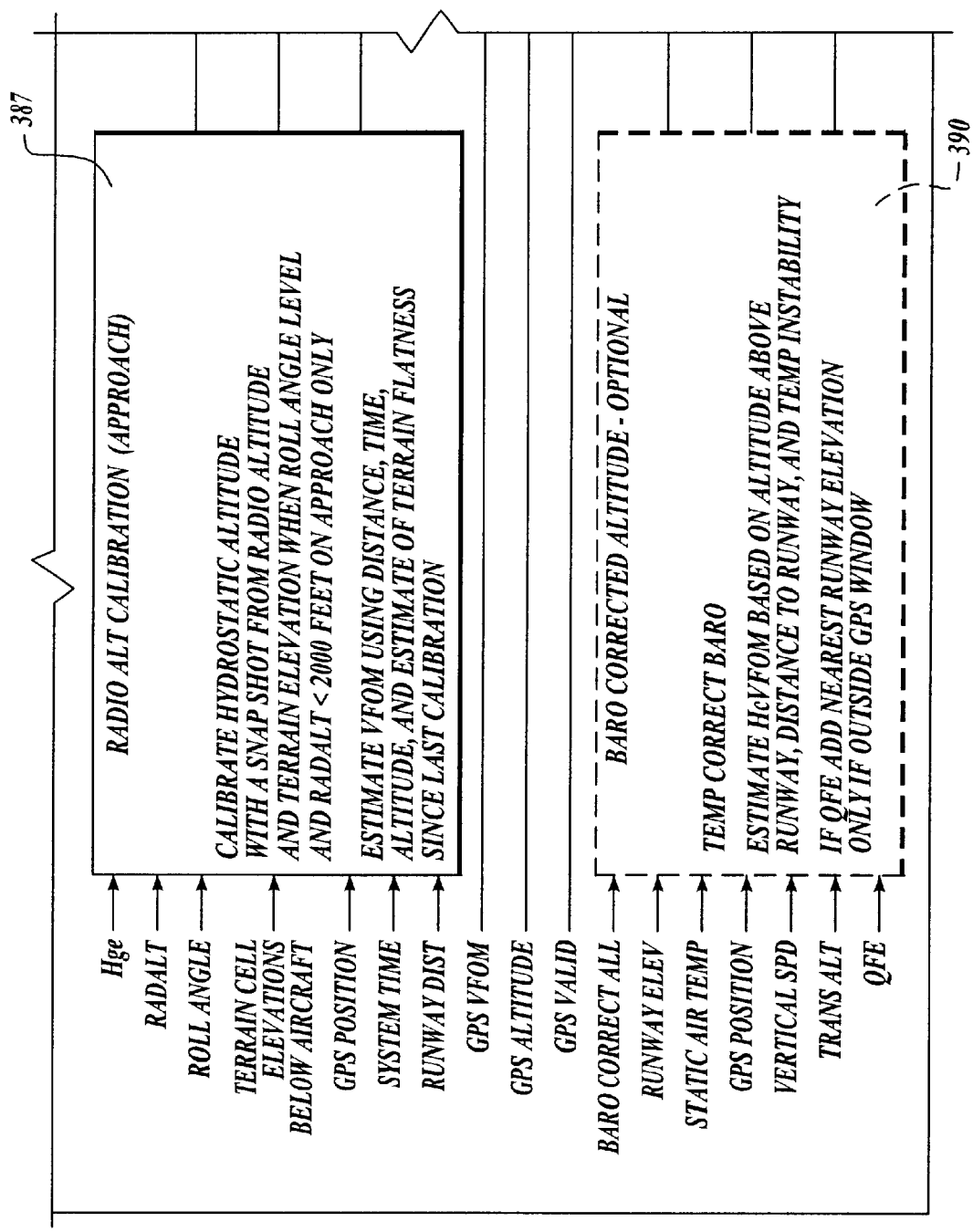
Figure 5D:
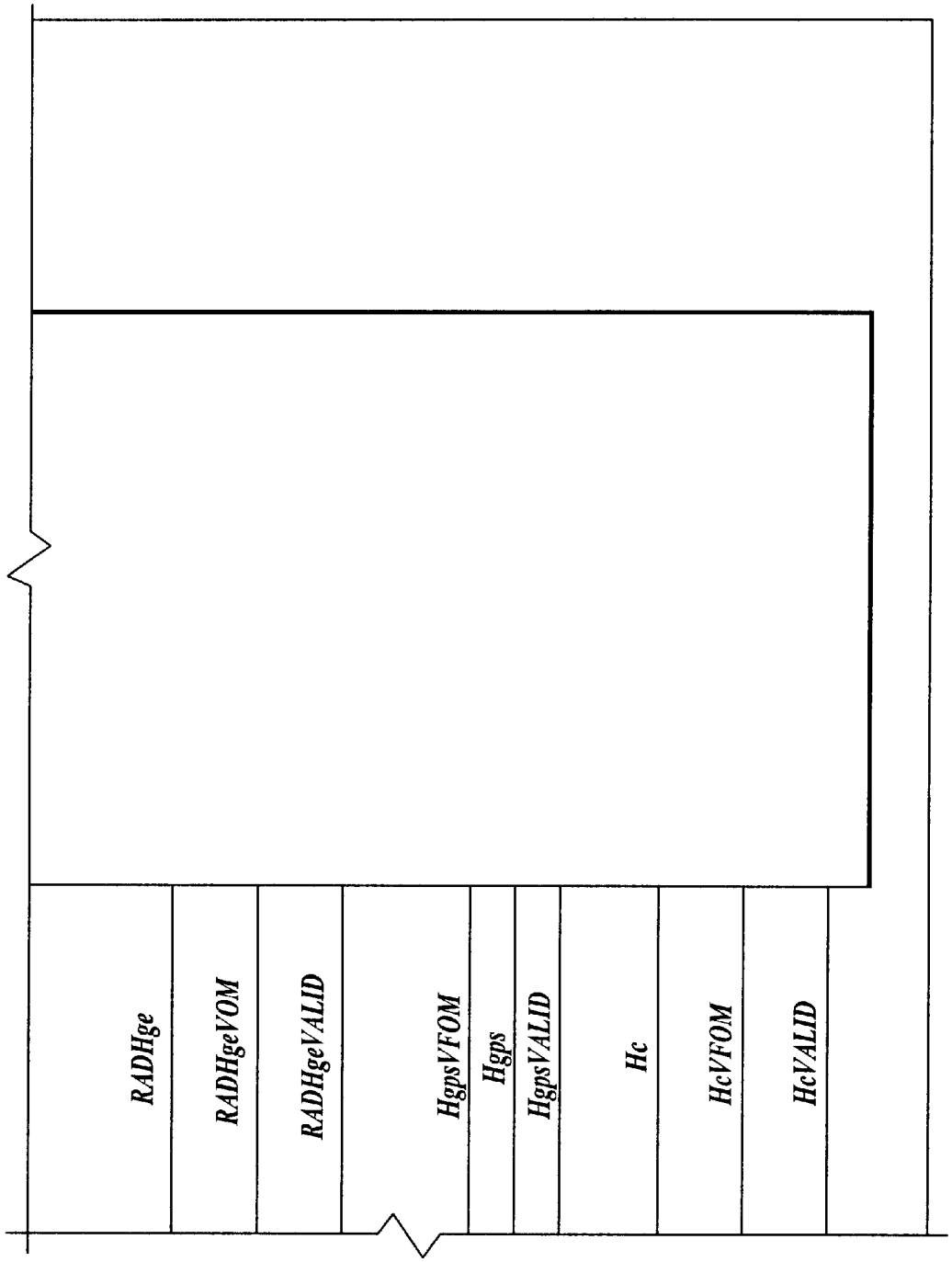

The blended geometric altitude provided by the system of FIGS. 4–5 may be compared with the GPS altitude or other geometric altitude source input to FIG. 3. If the compared values are within reasonable agreement, the geometric altitude input of FIG. 3 may be assumed valid as indicated by signal 338 and the altitude checks performed by the logic of FIG. 3 may be reasonably relied upon.

A track hold device 345 is additionally provided in FIG. 3 to further reduce nuisance alerts. Track hold device 345 ensures that any signal output by AND function 332 remains in either the asserted or deasserted state for at least 15 seconds before changing the status of Pressure Altitude rate of change error signal 14. Track hold device 345 thus inhibits the toggling of annunciation circuit 4 until a steady state condition is established.

Pressure Altitude Absolute Error Logic

Figure 6:
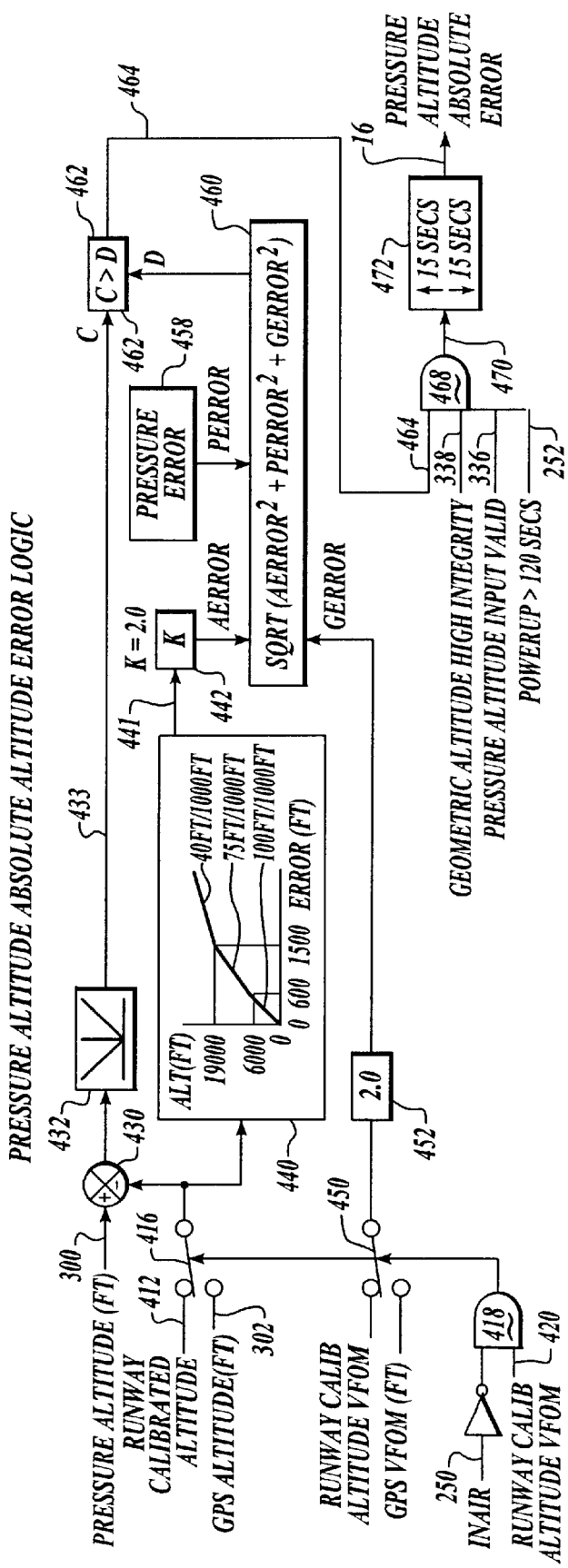
FIG. 6 is a transfer diagram for identifying an error in pressure altitude absolute altitude according to a preferred embodiment of the present invention.

The pressure altitude absolute error logic of FIG. 6 examines the difference between pressure altitude, and geometric altitude as measured by another source. Geometric altitude corresponds to the true "tape measure" altitude above sea level. Pressure altitude corresponds to what the barometric altimeter reads when the sea level reference barometric pressure is set to 29.92 inches of mercury. A standard model of the atmosphere exists in which the changes in pressure, temperature and density are described as a function of height above sea level. The standard sea level pressure assumed by the model is 29.92 inches of mercury. Therefore, on a day when the actual air conditions approximate the values assumed in the standard model atmosphere, the pressure altitude will equal the geometric altitude. On days where conditions deviate from standard, the error between pressure altitude geometric altitude can be computed or at least bounded. The present invention makes use of these properties to check whether the pressure altitude as measured by the aircraft pneumatic systems is within reasonable limits of the geometric altitude, as measured by an independent sensor. In a preferred embodiment of the invention, this independent sensor comprises a global positioning device.

In the logic diagram of FIG. 6, pressure altitude is compared to one of a runway calibrated altitude 412 or GPS altitude 302. Runway calibrated altitude 412 may be obtained from a terrain data base such as that used with, for example, an Enhanced Ground Proximity Warning System. Optionally, runway calibrated altitude 412 is a conditioned value obtained using the "Method and Apparatus for Determining Altitude" as described in the aforesaid patent application. Use of runway calibrated altitude 412 when the aircraft is not airborne is optional. The GPS altitude 302 may be used for all cases.

When available, use of runway calibrated altitude 412 and GPS altitude 302 when airborne is toggled by a switch 416. Switch 416 is toggled by a logical AND function which asserts a signal when both INAIR signal 250 indicates the aircraft is on the ground and when signal 420 indicates the system for calibrating the runway altitude is operational. When the aircraft is airborne, AND function 418 is deasserted and switch 416 toggles to the lower position, thereby coupling GPS altitude signal 302 to junction 430. Junction 430 obtains the difference between the geometric altitude as measured by GPS signal 302 or runway altitude signal 412 and the pressure altitude 300. Function generator 432 obtains the absolute value of this difference and outputs this value as signal C on line 433.

The geometric altitude value switched at switch 416 is additionally provided to a second function generator 440.

Function generator 440 models the theoretical difference 441 between pressure altitude and geometric altitude as a function of the observed geometric altitude. For example, according to the function graphed in function generator 440, a probable error of 6400 feet exists in the pressure altitude measurement when the geometric altitude measurement reads 6000 feet. The difference signal 441 is multiplied by a gain 442 to obtain an AERROR estimate signal. In the embodiment of FIG. 6, gain 442 equals 2. The gain chosen may be any value, however, the gain is preferably chosen to provide a tolerance value, or confidence margin in the error, such that one may be assured that the maximum error would reasonably fall within the value represented by signal AERROR.

A figure of merit value, or FOM, value is also switched according to AND function 418. The FOM value is an estimate of the error associated with the sensor used to sense geometric altitude. The particular FOM latched by the switch 450 depends upon whether the aircraft is airborne as explained above in connection with the operation of AND function 418. Most GPS units in use today provide a FOM value directly. If the runway calibrated altitude is used, the FOM may be provided by that system in the manner described in U.S. patent application Ser. No. 09/255,670. The FOM value latched by switch 450 is also multiplied by a gain 452 to obtain a geometric error signal GERROR.

A third source of error may occur if the actual sea level pressure differs significantly from standard. Such conditions occur infrequently, but have been known to result in serious altimetry errors. The possibility of such an error being present is accounted for by box 458 of FIG. 6. It is unlikely that an extreme deviation from standard pressure would result in an error of more than 1000 feet. For this reason, box 458 includes a constant, K, equal to 1000 feet, and which represents the error due to extreme deviations from standard pressure, PERROR. Other values for the constant K may be chosen while still keeping with the principles of the present invention.

Each of the three possible errors: AERROR, GERROR and PERROR are input to a third function generator 460. Generator 460 takes the square root of the sum of the squares (RSS) of the three error values to obtain a probable error budget value, signal D. The RSS method of quantifying errors is well known to those of skill in the art. Other techniques, also known to those of skill in the art may also be used.

The amount of acceptable error in the discrepancy between the pressure altitude and geometric altitude measurements is therefore represented by signal D. Signal D is then compared with signal C which represents the actual difference between the two measures. If signal C exceeds the error budget represented by signal D, comparator 462 asserts a signal 464 to indicate a possible error in the pressure altitude measurement.

Signal 464 is supplied to an AND function 468, which operates in a manner similar to AND function 332 of FIG. 3. Thus, AND function 468 will assert a signal 470 indicating a possible pressure altitude error when the sensors have been powered for a sufficient time so as to be thermally stable and both the geometric altitude sensor system and pressure altitude sensor appear to be operational.

To prevent nuisance alerts, the logic diagrammed in FIG. 6 also includes a track hold device 472. Track hold device 472 ensures that signal 470 output by AND function 468 remains either deasserted or asserted for at least 15 seconds before changing the status of pressure altitude absolute error signal 16.

Implementation

Figure 7:
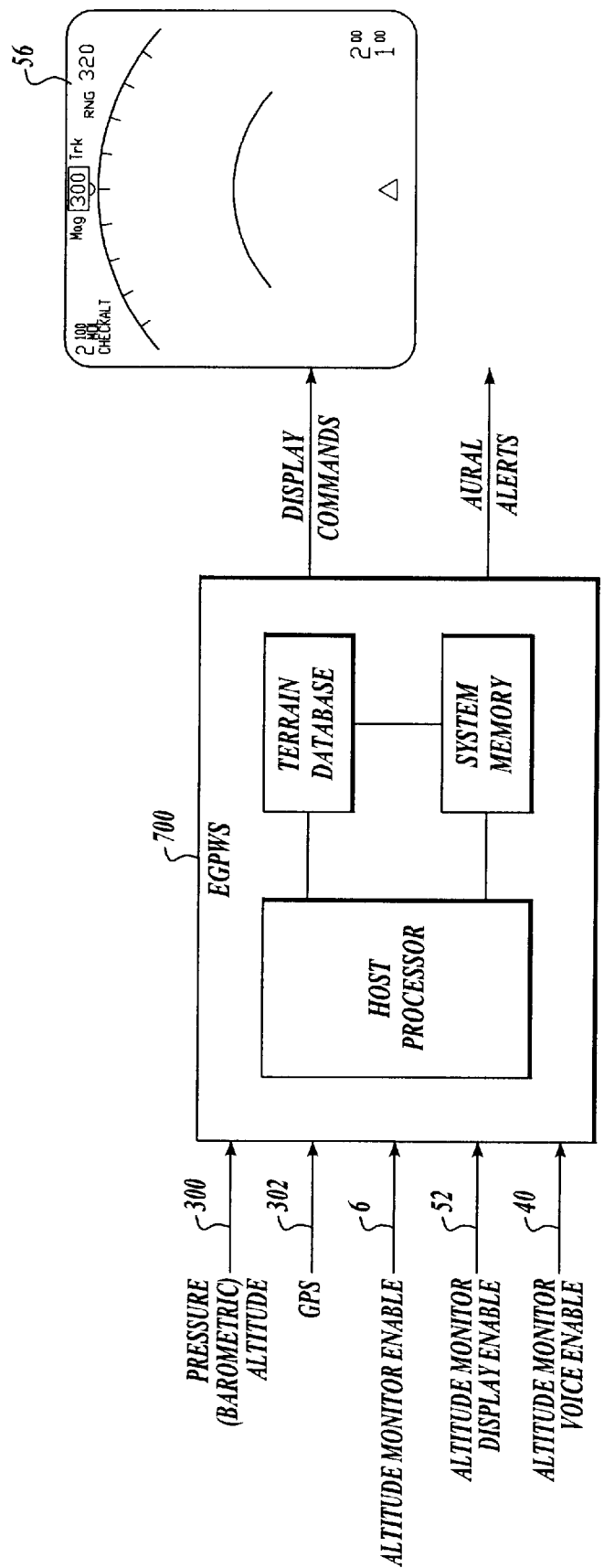
FIG. 7 is a block diagram of a GPWS system for hosting the present invention.

The invention as herein described may be implemented in a variety of fashions. For example, the invention may be implemented as a sequence of computer program instructions or in firmware as electronic microcircuitry. In a preferred embodiment, the invention is hosted on a device having a general purpose processor. Such an implementation saves weight and power. Numerous aircraft systems contain a processor and receive those inputs, or can be readily wired to receive, those inputs used by the present invention. The aircraft flight management system (FMS), the TCAS, and the transponder are examples of existing aircraft systems on which the present invention may be hosted. In a preferred embodiment of the invention, the aircraft EGPWS is used to host the present invention and to drive the alerting display and aural alerts. FIG. 7 illustrates an embodiment in which an EGPWS 700 hosts the present invention and drives a display 56. Display 56 may be the combination terrain awareness/weather radar/TCAS display typically coupled to the EGPWS device. Optionally display 56 may comprise any other available cockpit display.

Preferred embodiments of the invention have now been described. Variations and modifications will be readily apparent to those of skill in the art. The invention is therefore to be interpreted in light of the claims.

TABLE 1

Gillham Grey Code Chart

| Attitude | D4 | A1 | A2 | A4 | B1 | B2 | B4 | C1 | C2 | C4 |
|---|---|---|---|---|---|---|---|---|---|---|
| −1000 | 0 | 0 | 0 | 0 | 0 | 0 | 0 | 0 | 1 | 0 |
| −900 | 0 | 0 | 0 | 0 | 0 | 0 | 0 | 1 | 1 | 0 |
| −800 | 0 | 0 | 0 | 0 | 0 | 0 | 0 | 1 | 0 | 0 |
| −700 | 0 | 0 | 0 | 0 | 0 | 0 | 1 | 1 | 0 | 0 |
| −600 | 0 | 0 | 0 | 0 | 0 | 0 | 1 | 1 | 1 | 0 |
| −500 | 0 | 0 | 0 | 0 | 0 | 0 | 1 | 0 | 1 | 0 |
| −400 | 0 | 0 | 0 | 0 | 0 | 0 | 1 | 0 | 1 | 1 |
| −300 | 0 | 0 | 0 | 0 | 0 | 0 | 1 | 0 | 0 | 1 |
| −200 | 0 | 0 | 0 | 0 | 0 | 1 | 1 | 0 | 0 | 1 |
| −100 | 0 | 0 | 0 | 0 | 0 | 1 | 1 | 0 | 1 | 1 |
| 0 | 0 | 0 | 0 | 0 | 0 | 1 | 1 | 0 | 1 | 0 |
| 100 | 0 | 0 | 0 | 0 | 0 | 1 | 1 | 1 | 1 | 0 |
| 200 | 0 | 0 | 0 | 0 | 0 | 1 | 1 | 1 | 0 | 0 |
| 300 | 0 | 0 | 0 | 0 | 0 | 1 | 0 | 1 | 0 | 0 |
| 400 | 0 | 0 | 0 | 0 | 0 | 1 | 0 | 1 | 1 | 0 |
| 500 | 0 | 0 | 0 | 0 | 0 | 1 | 0 | 0 | 1 | 0 |
| 600 | 0 | 0 | 0 | 0 | 0 | 1 | 0 | 0 | 1 | 1 |
| 700 | 0 | 0 | 0 | 0 | 0 | 1 | 0 | 0 | 0 | 1 |
| 800 | 0 | 0 | 0 | 0 | 1 | 1 | 0 | 0 | 0 | 1 |
| 900 | 0 | 0 | 0 | 0 | 1 | 1 | 0 | 0 | 1 | 1 |
| 1000 | 0 | 0 | 0 | 0 | 1 | 1 | 0 | 0 | 1 | 0 |
| 1100 | 0 | 0 | 0 | 0 | 1 | 1 | 0 | 1 | 1 | 0 |
| 1200 | 0 | 0 | 0 | 0 | 1 | 1 | 0 | 1 | 0 | 0 |
| 1300 | 0 | 0 | 0 | 0 | 1 | 1 | 1 | 1 | 0 | 0 |
| 1400 | 0 | 0 | 0 | 0 | 1 | 1 | 1 | 1 | 1 | 0 |
| 1500 | 0 | 0 | 0 | 0 | 1 | 1 | 1 | 0 | 1 | 0 |
| 1600 | 0 | 0 | 0 | 0 | 1 | 1 | 1 | 0 | 1 | 1 |
| 1700 | 0 | 0 | 0 | 0 | 1 | 1 | 1 | 0 | 0 | 1 |
| 1800 | 0 | 0 | 0 | 0 | 1 | 0 | 1 | 0 | 0 | 1 |
| 1900 | 0 | 0 | 0 | 0 | 1 | 0 | 1 | 0 | 1 | 1 |
| 2000 | 0 | 0 | 0 | 0 | 1 | 0 | 1 | 0 | 1 | 0 |
| 2100 | 0 | 0 | 0 | 0 | 1 | 0 | 1 | 1 | 1 | 0 |
| 2200 | 0 | 0 | 0 | 0 | 1 | 0 | 1 | 1 | 0 | 0 |
| 2300 | 0 | 0 | 0 | 0 | 1 | 0 | 0 | 1 | 0 | 0 |
| 2400 | 0 | 0 | 0 | 0 | 1 | 0 | 0 | 1 | 1 | 0 |
| 2500 | 0 | 0 | 0 | 0 | 1 | 0 | 0 | 0 | 1 | 0 |
| 2600 | 0 | 0 | 0 | 0 | 1 | 0 | 0 | 0 | 1 | 1 |
| 2700 | 0 | 0 | 0 | 0 | 1 | 0 | 0 | 0 | 0 | 1 |
| 2800 | 0 | 0 | 0 | 1 | 1 | 0 | 0 | 0 | 0 | 1 |
| 2900 | 0 | 0 | 0 | 1 | 1 | 0 | 0 | 0 | 1 | 1 |
| 3000 | 0 | 0 | 0 | 1 | 1 | 0 | 0 | 0 | 1 | 0 |
| 3100 | 0 | 0 | 0 | 1 | 1 | 0 | 0 | 1 | 1 | 0 |
| 3200 | 0 | 0 | 0 | 1 | 1 | 0 | 0 | 1 | 0 | 0 |

TABLE 1-continued

Gillham Grey Code Chart

| Attitude | D4 | A1 | A2 | A4 | B1 | B2 | B4 | C1 | C2 | C4 |
|---|---|---|---|---|---|---|---|---|---|---|
| 3300 | 0 | 0 | 0 | 1 | 1 | 0 | 1 | 1 | 0 | 0 |
| 3400 | 0 | 0 | 0 | 1 | 1 | 0 | 1 | 1 | 1 | 0 |
| 3500 | 0 | 0 | 0 | 1 | 1 | 0 | 1 | 0 | 1 | 0 |
| 3600 | 0 | 0 | 0 | 1 | 1 | 0 | 1 | 0 | 1 | 1 |
| 3700 | 0 | 0 | 0 | 1 | 1 | 0 | 1 | 0 | 0 | 1 |
| 3800 | 0 | 0 | 0 | 1 | 1 | 1 | 1 | 0 | 0 | 1 |
| 3900 | 0 | 0 | 0 | 1 | 1 | 1 | 1 | 0 | 1 | 1 |
| 4000 | 0 | 0 | 0 | 1 | 1 | 1 | 1 | 0 | 1 | 0 |
| 4100 | 0 | 0 | 0 | 1 | 1 | 1 | 1 | 1 | 1 | 0 |
| 4200 | 0 | 0 | 0 | 1 | 1 | 1 | 1 | 1 | 0 | 0 |
| 4300 | 0 | 0 | 0 | 1 | 1 | 1 | 0 | 1 | 0 | 0 |
| 4400 | 0 | 0 | 0 | 1 | 1 | 1 | 0 | 1 | 1 | 0 |
| 4500 | 0 | 0 | 0 | 1 | 1 | 1 | 0 | 0 | 1 | 0 |
| 4600 | 0 | 0 | 0 | 1 | 1 | 1 | 0 | 0 | 1 | 1 |
| 4700 | 0 | 0 | 0 | 1 | 1 | 1 | 0 | 0 | 0 | 1 |
| 4800 | 0 | 0 | 0 | 1 | 0 | 1 | 0 | 0 | 0 | 1 |
| 4900 | 0 | 0 | 0 | 1 | 0 | 1 | 0 | 0 | 1 | 1 |
| 5000 | 0 | 0 | 0 | 1 | 0 | 1 | 0 | 0 | 1 | 0 |
| 5100 | 0 | 0 | 0 | 1 | 0 | 1 | 0 | 1 | 1 | 0 |
| 5200 | 0 | 0 | 0 | 1 | 0 | 1 | 0 | 1 | 0 | 0 |
| 5300 | 0 | 0 | 0 | 1 | 0 | 1 | 1 | 1 | 0 | 0 |
| 5400 | 0 | 0 | 0 | 1 | 0 | 1 | 1 | 1 | 1 | 0 |
| 5500 | 0 | 0 | 0 | 1 | 0 | 1 | 1 | 0 | 1 | 0 |
| 5600 | 0 | 0 | 0 | 1 | 0 | 1 | 1 | 0 | 1 | 1 |
| 5700 | 0 | 0 | 0 | 1 | 0 | 1 | 1 | 0 | 0 | 1 |
| 5800 | 0 | 0 | 0 | 1 | 0 | 0 | 1 | 0 | 0 | 1 |
| 5900 | 0 | 0 | 0 | 1 | 0 | 0 | 1 | 0 | 1 | 1 |
| 6000 | 0 | 0 | 0 | 1 | 0 | 0 | 1 | 0 | 1 | 0 |
| 6100 | 0 | 0 | 0 | 1 | 0 | 0 | 1 | 1 | 1 | 0 |
| 6200 | 0 | 0 | 0 | 1 | 0 | 0 | 1 | 1 | 0 | 0 |
| 6300 | 0 | 0 | 0 | 1 | 0 | 0 | 0 | 1 | 0 | 0 |
| 6400 | 0 | 0 | 0 | 1 | 0 | 0 | 0 | 1 | 1 | 0 |
| 6500 | 0 | 0 | 0 | 1 | 0 | 0 | 0 | 0 | 1 | 0 |
| 6600 | 0 | 0 | 0 | 1 | 0 | 0 | 0 | 0 | 1 | 1 |
| 6700 | 0 | 0 | 0 | 1 | 0 | 0 | 0 | 0 | 0 | 1 |
| 6800 | 0 | 0 | 1 | 1 | 0 | 0 | 0 | 0 | 0 | 1 |
| 6900 | 0 | 0 | 1 | 1 | 0 | 0 | 0 | 0 | 1 | 1 |
| 7000 | 0 | 0 | 1 | 1 | 0 | 0 | 0 | 0 | 1 | 0 |
| 7100 | 0 | 0 | 1 | 1 | 0 | 0 | 0 | 1 | 1 | 0 |
| 7200 | 0 | 0 | 1 | 1 | 0 | 0 | 0 | 1 | 0 | 0 |
| 7300 | 0 | 0 | 1 | 1 | 0 | 0 | 1 | 1 | 0 | 0 |
| 7400 | 0 | 0 | 1 | 1 | 0 | 0 | 1 | 1 | 1 | 0 |
| 7500 | 0 | 0 | 1 | 1 | 0 | 0 | 1 | 0 | 1 | 0 |
| 7600 | 0 | 0 | 1 | 1 | 0 | 0 | 1 | 0 | 1 | 1 |
| 7700 | 0 | 0 | 1 | 1 | 0 | 0 | 1 | 0 | 0 | 1 |
| 7800 | 0 | 0 | 1 | 1 | 0 | 1 | 1 | 0 | 0 | 1 |
| 7900 | 0 | 0 | 1 | 1 | 0 | 1 | 1 | 0 | 1 | 1 |
| 8000 | 0 | 0 | 1 | 1 | 0 | 1 | 1 | 0 | 1 | 0 |
| 8100 | 0 | 0 | 1 | 1 | 0 | 1 | 1 | 1 | 1 | 0 |
| 8200 | 0 | 0 | 1 | 1 | 0 | 1 | 1 | 1 | 0 | 0 |
| 8300 | 0 | 0 | 1 | 1 | 0 | 1 | 0 | 1 | 0 | 0 |
| 8400 | 0 | 0 | 1 | 1 | 0 | 1 | 0 | 1 | 1 | 0 |
| 8500 | 0 | 0 | 1 | 1 | 0 | 1 | 0 | 0 | 1 | 0 |
| 8600 | 0 | 0 | 1 | 1 | 0 | 1 | 0 | 0 | 1 | 1 |
| 8700 | 0 | 0 | 1 | 1 | 0 | 1 | 0 | 0 | 0 | 1 |
| 8800 | 0 | 0 | 1 | 1 | 1 | 1 | 0 | 0 | 0 | 1 |
| 8900 | 0 | 0 | 1 | 1 | 1 | 1 | 0 | 0 | 1 | 1 |
| 9000 | 0 | 0 | 1 | 1 | 1 | 1 | 0 | 0 | 1 | 0 |
| 9100 | 0 | 0 | 1 | 1 | 1 | 1 | 0 | 1 | 1 | 0 |
| 9200 | 0 | 0 | 1 | 1 | 1 | 1 | 0 | 1 | 0 | 0 |
| 9300 | 0 | 0 | 1 | 1 | 1 | 1 | 1 | 1 | 0 | 0 |
| 9400 | 0 | 0 | 1 | 1 | 1 | 1 | 1 | 1 | 1 | 0 |
| 9500 | 0 | 0 | 1 | 1 | 1 | 1 | 1 | 0 | 1 | 0 |
| 9600 | 0 | 0 | 1 | 1 | 1 | 1 | 1 | 0 | 1 | 1 |
| 9700 | 0 | 0 | 1 | 1 | 1 | 1 | 1 | 0 | 0 | 1 |
| 9800 | 0 | 0 | 1 | 1 | 1 | 0 | 1 | 0 | 0 | 1 |
| 9900 | 0 | 0 | 1 | 1 | 1 | 0 | 1 | 0 | 1 | 1 |
| 10000 | 0 | 0 | 1 | 1 | 1 | 0 | 1 | 0 | 1 | 0 |
| 10100 | 0 | 0 | 1 | 1 | 1 | 0 | 1 | 1 | 1 | 0 |
| 10200 | 0 | 0 | 1 | 1 | 1 | 0 | 1 | 1 | 0 | 0 |
| 10300 | 0 | 0 | 1 | 1 | 1 | 0 | 0 | 1 | 0 | 0 |
| 10400 | 0 | 0 | 1 | 1 | 1 | 0 | 0 | 1 | 1 | 0 |
| 10500 | 0 | 0 | 1 | 1 | 1 | 0 | 0 | 0 | 1 | 0 |
| 10600 | 0 | 0 | 1 | 1 | 1 | 0 | 0 | 0 | 1 | 1 |
| 10700 | 0 | 0 | 1 | 1 | 1 | 0 | 0 | 0 | 0 | 1 |
| 10800 | 0 | 0 | 1 | 0 | 1 | 0 | 0 | 0 | 0 | 1 |
| 10900 | 0 | 0 | 1 | 0 | 1 | 0 | 0 | 0 | 1 | 1 |
| 11000 | 0 | 0 | 1 | 0 | 1 | 0 | 0 | 0 | 1 | 0 |
| 11100 | 0 | 0 | 1 | 0 | 1 | 0 | 0 | 1 | 1 | 0 |
| 11200 | 0 | 0 | 1 | 0 | 1 | 0 | 0 | 1 | 0 | 0 |
| 11300 | 0 | 0 | 1 | 0 | 1 | 0 | 1 | 1 | 0 | 0 |
| 11400 | 0 | 0 | 1 | 0 | 1 | 0 | 1 | 1 | 1 | 0 |
| 11500 | 0 | 0 | 1 | 0 | 1 | 0 | 1 | 0 | 1 | 0 |
| 11600 | 0 | 0 | 1 | 0 | 1 | 0 | 1 | 0 | 1 | 1 |
| 11700 | 0 | 0 | 1 | 0 | 1 | 0 | 1 | 0 | 0 | 1 |
| 11800 | 0 | 0 | 1 | 0 | 1 | 1 | 1 | 0 | 0 | 1 |
| 11900 | 0 | 0 | 1 | 0 | 1 | 1 | 1 | 0 | 1 | 1 |
| 12000 | 0 | 0 | 1 | 0 | 1 | 1 | 1 | 0 | 1 | 0 |
| 12100 | 0 | 0 | 1 | 0 | 1 | 1 | 1 | 1 | 1 | 0 |
| 12200 | 0 | 0 | 1 | 0 | 1 | 1 | 1 | 1 | 0 | 0 |
| 12300 | 0 | 0 | 1 | 0 | 1 | 1 | 0 | 1 | 0 | 0 |
| 12400 | 0 | 0 | 1 | 0 | 1 | 1 | 0 | 1 | 1 | 0 |
| 12500 | 0 | 0 | 1 | 0 | 1 | 1 | 0 | 0 | 1 | 0 |
| 12600 | 0 | 0 | 1 | 0 | 1 | 1 | 0 | 0 | 1 | 1 |
| 12700 | 0 | 0 | 1 | 0 | 1 | 1 | 0 | 0 | 0 | 1 |
| 12800 | 0 | 0 | 1 | 0 | 0 | 1 | 0 | 0 | 0 | 1 |
| 12900 | 0 | 0 | 1 | 0 | 0 | 1 | 0 | 0 | 1 | 1 |
| 13000 | 0 | 0 | 1 | 0 | 0 | 1 | 0 | 0 | 1 | 0 |
| 13100 | 0 | 0 | 1 | 0 | 0 | 1 | 0 | 1 | 1 | 0 |
| 13200 | 0 | 0 | 1 | 0 | 0 | 1 | 0 | 1 | 0 | 0 |
| 13300 | 0 | 0 | 1 | 0 | 0 | 1 | 1 | 1 | 0 | 0 |
| 13400 | 0 | 0 | 1 | 0 | 0 | 1 | 1 | 1 | 1 | 0 |
| 13500 | 0 | 0 | 1 | 0 | 0 | 1 | 1 | 0 | 1 | 0 |
| 13600 | 0 | 0 | 1 | 0 | 0 | 1 | 1 | 0 | 1 | 1 |
| 13700 | 0 | 0 | 1 | 0 | 0 | 1 | 1 | 0 | 0 | 1 |
| 13800 | 0 | 0 | 1 | 0 | 0 | 0 | 1 | 0 | 0 | 1 |
| 13900 | 0 | 0 | 1 | 0 | 0 | 0 | 1 | 0 | 1 | 1 |
| 14000 | 0 | 0 | 1 | 0 | 0 | 0 | 1 | 0 | 1 | 0 |
| 14100 | 0 | 0 | 1 | 0 | 0 | 0 | 1 | 1 | 1 | 0 |
| 14200 | 0 | 0 | 1 | 0 | 0 | 0 | 1 | 1 | 0 | 0 |
| 14300 | 0 | 0 | 1 | 0 | 0 | 0 | 0 | 1 | 0 | 0 |
| 14400 | 0 | 0 | 1 | 0 | 0 | 0 | 0 | 1 | 1 | 0 |
| 14500 | 0 | 0 | 1 | 0 | 0 | 0 | 0 | 0 | 1 | 0 |
| 14600 | 0 | 0 | 1 | 0 | 0 | 0 | 0 | 0 | 1 | 1 |
| 14700 | 0 | 0 | 1 | 0 | 0 | 0 | 0 | 0 | 0 | 1 |
| 14800 | 0 | 1 | 1 | 0 | 0 | 0 | 0 | 0 | 0 | 1 |
| 14900 | 0 | 1 | 1 | 0 | 0 | 0 | 0 | 0 | 1 | 1 |
| 15000 | 0 | 1 | 1 | 0 | 0 | 0 | 0 | 0 | 1 | 0 |
| 15100 | 0 | 1 | 1 | 0 | 0 | 0 | 0 | 1 | 1 | 0 |
| 15200 | 0 | 1 | 1 | 0 | 0 | 0 | 0 | 1 | 0 | 0 |
| 15300 | 0 | 1 | 1 | 0 | 0 | 0 | 1 | 1 | 0 | 0 |
| 15400 | 0 | 1 | 1 | 0 | 0 | 0 | 1 | 1 | 1 | 0 |
| 15500 | 0 | 1 | 1 | 0 | 0 | 0 | 1 | 0 | 1 | 0 |
| 15600 | 0 | 1 | 1 | 0 | 0 | 0 | 1 | 0 | 1 | 1 |
| 15700 | 0 | 1 | 1 | 0 | 0 | 0 | 1 | 0 | 0 | 1 |
| 15800 | 0 | 1 | 1 | 0 | 0 | 1 | 1 | 0 | 0 | 1 |
| 15900 | 0 | 1 | 1 | 0 | 0 | 1 | 1 | 0 | 1 | 1 |
| 16000 | 0 | 1 | 1 | 0 | 0 | 1 | 1 | 0 | 1 | 0 |
| 16100 | 0 | 1 | 1 | 0 | 0 | 1 | 1 | 1 | 1 | 0 |
| 16200 | 0 | 1 | 1 | 0 | 0 | 1 | 1 | 1 | 0 | 0 |
| 16300 | 0 | 1 | 1 | 0 | 0 | 1 | 0 | 1 | 0 | 0 |
| 16400 | 0 | 1 | 1 | 0 | 0 | 1 | 0 | 1 | 1 | 0 |
| 16500 | 0 | 1 | 1 | 0 | 0 | 1 | 0 | 0 | 1 | 0 |
| 16600 | 0 | 1 | 1 | 0 | 0 | 1 | 0 | 0 | 1 | 1 |
| 16700 | 0 | 1 | 1 | 0 | 0 | 1 | 0 | 0 | 0 | 1 |
| 16800 | 0 | 1 | 1 | 0 | 1 | 1 | 0 | 0 | 0 | 1 |
| 16900 | 0 | 1 | 1 | 0 | 1 | 1 | 0 | 0 | 1 | 1 |
| 17000 | 0 | 1 | 1 | 0 | 1 | 1 | 0 | 0 | 1 | 0 |
| 17100 | 0 | 1 | 1 | 0 | 1 | 1 | 0 | 1 | 1 | 0 |
| 17200 | 0 | 1 | 1 | 0 | 1 | 1 | 0 | 1 | 0 | 0 |
| 17300 | 0 | 1 | 1 | 0 | 1 | 1 | 1 | 1 | 0 | 0 |
| 17400 | 0 | 1 | 1 | 0 | 1 | 1 | 1 | 1 | 1 | 0 |
| 17500 | 0 | 1 | 1 | 0 | 1 | 1 | 1 | 0 | 1 | 0 |
| 17600 | 0 | 1 | 1 | 0 | 1 | 1 | 1 | 0 | 1 | 1 |
| 17700 | 0 | 1 | 1 | 0 | 1 | 1 | 1 | 0 | 0 | 1 |
| 17800 | 0 | 1 | 1 | 0 | 1 | 0 | 1 | 0 | 0 | 1 |
| 17900 | 0 | 1 | 1 | 0 | 1 | 0 | 1 | 0 | 1 | 1 |
| 18000 | 0 | 1 | 1 | 0 | 1 | 0 | 1 | 0 | 1 | 0 |
| 18100 | 0 | 1 | 1 | 0 | 1 | 0 | 1 | 1 | 1 | 0 |
| 18200 | 0 | 1 | 1 | 0 | 1 | 0 | 1 | 1 | 0 | 0 |

TABLE 1-continued

Gillham Grey Code Chart

| Attitude | D4 | A1 | A2 | A4 | B1 | B2 | B4 | C1 | C2 | C4 |
|---|---|---|---|---|---|---|---|---|---|---|
| 18300 | 0 | 1 | 1 | 0 | 1 | 0 | 0 | 1 | 0 | 0 |
| 18400 | 0 | 1 | 1 | 0 | 1 | 0 | 0 | 1 | 1 | 0 |
| 18500 | 0 | 1 | 1 | 0 | 1 | 0 | 0 | 0 | 1 | 0 |
| 18600 | 0 | 1 | 1 | 0 | 1 | 0 | 0 | 0 | 1 | 1 |
| 18700 | 0 | 1 | 1 | 0 | 1 | 0 | 0 | 0 | 0 | 1 |
| 18800 | 0 | 1 | 1 | 1 | 1 | 0 | 0 | 0 | 0 | 1 |
| 18900 | 0 | 1 | 1 | 1 | 1 | 0 | 0 | 0 | 1 | 1 |
| 19000 | 0 | 1 | 1 | 1 | 1 | 0 | 0 | 0 | 1 | 0 |
| 19100 | 0 | 1 | 1 | 1 | 1 | 0 | 0 | 1 | 1 | 0 |
| 19200 | 0 | 1 | 1 | 1 | 1 | 0 | 0 | 1 | 0 | 0 |
| 19300 | 0 | 1 | 1 | 1 | 1 | 0 | 1 | 1 | 0 | 0 |
| 19400 | 0 | 1 | 1 | 1 | 1 | 0 | 1 | 1 | 1 | 0 |
| 19500 | 0 | 1 | 1 | 1 | 1 | 0 | 1 | 0 | 1 | 0 |
| 19600 | 0 | 1 | 1 | 1 | 1 | 0 | 1 | 0 | 1 | 1 |
| 19700 | 0 | 1 | 1 | 1 | 1 | 0 | 1 | 0 | 0 | 1 |
| 19800 | 0 | 1 | 1 | 1 | 1 | 1 | 1 | 0 | 0 | 1 |
| 19900 | 0 | 1 | 1 | 1 | 1 | 1 | 1 | 0 | 1 | 1 |
| 20000 | 0 | 1 | 1 | 1 | 1 | 1 | 1 | 0 | 1 | 0 |
| 20100 | 0 | 1 | 1 | 1 | 1 | 1 | 1 | 1 | 1 | 0 |
| 20200 | 0 | 1 | 1 | 1 | 1 | 1 | 1 | 1 | 0 | 0 |
| 20300 | 0 | 1 | 1 | 1 | 1 | 1 | 0 | 1 | 0 | 0 |
| 20400 | 0 | 1 | 1 | 1 | 1 | 1 | 0 | 1 | 1 | 0 |
| 20500 | 0 | 1 | 1 | 1 | 1 | 1 | 0 | 0 | 1 | 0 |
| 20600 | 0 | 1 | 1 | 1 | 1 | 1 | 0 | 0 | 1 | 1 |
| 20700 | 0 | 1 | 1 | 1 | 1 | 1 | 0 | 0 | 0 | 1 |
| 20800 | 0 | 1 | 1 | 1 | 0 | 1 | 0 | 0 | 0 | 1 |
| 20900 | 0 | 1 | 1 | 1 | 0 | 1 | 0 | 0 | 1 | 1 |
| 21000 | 0 | 1 | 1 | 1 | 0 | 1 | 0 | 0 | 1 | 0 |
| 21100 | 0 | 1 | 1 | 1 | 0 | 1 | 0 | 1 | 1 | 0 |
| 21200 | 0 | 1 | 1 | 1 | 0 | 1 | 0 | 1 | 0 | 0 |
| 21300 | 0 | 1 | 1 | 1 | 0 | 1 | 1 | 1 | 0 | 0 |
| 21400 | 0 | 1 | 1 | 1 | 0 | 1 | 1 | 1 | 1 | 0 |
| 21500 | 0 | 1 | 1 | 1 | 0 | 1 | 1 | 0 | 1 | 0 |
| 21600 | 0 | 1 | 1 | 1 | 0 | 1 | 1 | 0 | 1 | 1 |
| 21700 | 0 | 1 | 1 | 1 | 0 | 1 | 1 | 0 | 0 | 1 |
| 21800 | 0 | 1 | 1 | 1 | 0 | 0 | 1 | 0 | 0 | 1 |
| 21900 | 0 | 1 | 1 | 1 | 0 | 0 | 1 | 0 | 1 | 1 |
| 22000 | 0 | 1 | 1 | 1 | 0 | 0 | 1 | 0 | 1 | 0 |
| 22100 | 0 | 1 | 1 | 1 | 0 | 0 | 1 | 1 | 1 | 0 |
| 22200 | 0 | 1 | 1 | 1 | 0 | 0 | 1 | 1 | 0 | 0 |
| 22300 | 0 | 1 | 1 | 1 | 0 | 0 | 0 | 1 | 0 | 0 |
| 22400 | 0 | 1 | 1 | 1 | 0 | 0 | 0 | 1 | 1 | 0 |
| 22500 | 0 | 1 | 1 | 1 | 0 | 0 | 0 | 0 | 1 | 0 |
| 22600 | 0 | 1 | 1 | 1 | 0 | 0 | 0 | 0 | 1 | 1 |
| 22700 | 0 | 1 | 1 | 1 | 0 | 0 | 0 | 0 | 0 | 1 |
| 22800 | 0 | 1 | 0 | 1 | 0 | 0 | 0 | 0 | 0 | 1 |
| 22900 | 0 | 1 | 0 | 1 | 0 | 0 | 0 | 0 | 1 | 1 |
| 23000 | 0 | 1 | 0 | 1 | 0 | 0 | 0 | 0 | 1 | 0 |
| 23100 | 0 | 1 | 0 | 1 | 0 | 0 | 1 | 1 | 1 | 0 |
| 23200 | 0 | 1 | 0 | 1 | 0 | 0 | 0 | 1 | 0 | 0 |
| 23300 | 0 | 1 | 0 | 1 | 0 | 0 | 1 | 1 | 0 | 0 |
| 23400 | 0 | 1 | 0 | 1 | 0 | 0 | 1 | 1 | 1 | 0 |
| 23500 | 0 | 1 | 0 | 1 | 0 | 0 | 1 | 0 | 1 | 0 |
| 23600 | 0 | 1 | 0 | 1 | 0 | 0 | 1 | 0 | 1 | 1 |
| 23700 | 0 | 1 | 0 | 1 | 0 | 0 | 1 | 0 | 0 | 1 |
| 23800 | 0 | 1 | 0 | 1 | 0 | 1 | 1 | 0 | 0 | 1 |
| 23900 | 0 | 1 | 0 | 1 | 0 | 1 | 1 | 0 | 1 | 1 |
| 24000 | 0 | 1 | 0 | 1 | 0 | 1 | 1 | 0 | 1 | 0 |
| 24100 | 0 | 1 | 0 | 1 | 0 | 1 | 1 | 1 | 1 | 0 |
| 24200 | 0 | 1 | 0 | 1 | 0 | 1 | 1 | 1 | 0 | 0 |
| 24300 | 0 | 1 | 0 | 1 | 0 | 1 | 0 | 1 | 0 | 0 |
| 24400 | 0 | 1 | 0 | 1 | 0 | 1 | 0 | 1 | 1 | 0 |
| 24500 | 0 | 1 | 0 | 1 | 0 | 1 | 0 | 0 | 1 | 0 |
| 24600 | 0 | 1 | 0 | 1 | 0 | 1 | 0 | 0 | 1 | 1 |
| 24700 | 0 | 1 | 0 | 1 | 0 | 1 | 0 | 0 | 0 | 1 |
| 24800 | 0 | 1 | 0 | 1 | 1 | 1 | 0 | 0 | 0 | 1 |
| 24900 | 0 | 1 | 0 | 1 | 1 | 1 | 0 | 0 | 1 | 1 |
| 25000 | 0 | 1 | 0 | 1 | 1 | 1 | 0 | 0 | 1 | 0 |
| 25100 | 0 | 1 | 0 | 1 | 1 | 1 | 0 | 1 | 1 | 0 |
| 25200 | 0 | 1 | 0 | 1 | 1 | 1 | 0 | 1 | 0 | 0 |
| 25300 | 0 | 1 | 0 | 1 | 1 | 1 | 1 | 1 | 0 | 0 |
| 25400 | 0 | 1 | 0 | 1 | 1 | 1 | 1 | 1 | 1 | 0 |
| 25500 | 0 | 1 | 0 | 1 | 1 | 1 | 1 | 0 | 1 | 0 |
| 25600 | 0 | 1 | 0 | 1 | 1 | 1 | 1 | 0 | 0 | 1 |
| 25700 | 0 | 1 | 0 | 1 | 1 | 1 | 1 | 0 | 0 | 1 |
| 25800 | 0 | 1 | 0 | 1 | 1 | 0 | 1 | 0 | 0 | 1 |
| 25900 | 0 | 1 | 0 | 1 | 1 | 0 | 1 | 0 | 1 | 1 |
| 26000 | 0 | 1 | 0 | 1 | 1 | 0 | 1 | 0 | 1 | 0 |
| 26100 | 0 | 1 | 0 | 1 | 1 | 0 | 1 | 1 | 1 | 0 |
| 26200 | 0 | 1 | 0 | 1 | 1 | 0 | 1 | 1 | 0 | 0 |
| 26200 | 0 | 1 | 0 | 1 | 1 | 0 | 0 | 1 | 0 | 0 |
| 26400 | 0 | 1 | 0 | 1 | 1 | 0 | 0 | 1 | 1 | 0 |
| 26500 | 0 | 1 | 0 | 1 | 1 | 0 | 0 | 0 | 1 | 0 |
| 26600 | 0 | 1 | 0 | 1 | 1 | 0 | 0 | 0 | 1 | 1 |
| 26700 | 0 | 1 | 0 | 1 | 1 | 0 | 0 | 0 | 0 | 1 |
| 26800 | 0 | 1 | 0 | 0 | 1 | 0 | 0 | 0 | 0 | 1 |
| 26900 | 0 | 1 | 0 | 0 | 1 | 0 | 0 | 0 | 1 | 1 |
| 27000 | 0 | 1 | 0 | 0 | 1 | 0 | 0 | 0 | 1 | 0 |
| 27100 | 0 | 1 | 0 | 0 | 1 | 0 | 0 | 1 | 1 | 0 |
| 27200 | 0 | 1 | 0 | 0 | 1 | 0 | 0 | 1 | 0 | 0 |
| 27300 | 0 | 1 | 0 | 0 | 1 | 0 | 1 | 1 | 0 | 0 |
| 27400 | 0 | 1 | 0 | 0 | 1 | 0 | 1 | 1 | 1 | 0 |
| 27500 | 0 | 1 | 0 | 0 | 1 | 0 | 1 | 0 | 1 | 0 |
| 27600 | 0 | 1 | 0 | 0 | 1 | 0 | 1 | 0 | 1 | 1 |
| 27700 | 0 | 1 | 0 | 0 | 1 | 0 | 1 | 0 | 0 | 1 |
| 27800 | 0 | 1 | 0 | 0 | 1 | 1 | 1 | 0 | 0 | 1 |
| 27900 | 0 | 1 | 0 | 0 | 1 | 1 | 1 | 0 | 1 | 1 |
| 28000 | 0 | 1 | 0 | 0 | 1 | 1 | 1 | 0 | 1 | 0 |
| 28100 | 0 | 1 | 0 | 0 | 1 | 1 | 1 | 1 | 1 | 0 |
| 28200 | 0 | 1 | 0 | 0 | 1 | 1 | 1 | 1 | 0 | 0 |
| 28300 | 0 | 1 | 0 | 0 | 1 | 1 | 0 | 1 | 0 | 0 |
| 28400 | 0 | 1 | 0 | 0 | 1 | 1 | 0 | 1 | 1 | 0 |
| 28500 | 0 | 1 | 0 | 0 | 1 | 1 | 0 | 0 | 1 | 0 |
| 28600 | 0 | 1 | 0 | 0 | 1 | 1 | 0 | 0 | 1 | 1 |
| 28700 | 0 | 1 | 0 | 0 | 1 | 1 | 0 | 0 | 0 | 1 |
| 28800 | 0 | 1 | 0 | 0 | 0 | 1 | 0 | 0 | 0 | 1 |
| 28900 | 0 | 1 | 0 | 0 | 0 | 1 | 0 | 0 | 1 | 1 |
| 29000 | 0 | 1 | 0 | 0 | 0 | 1 | 0 | 0 | 1 | 0 |
| 29100 | 0 | 1 | 0 | 0 | 0 | 1 | 0 | 1 | 1 | 0 |
| 29200 | 0 | 1 | 0 | 0 | 0 | 1 | 0 | 1 | 0 | 0 |
| 29300 | 0 | 1 | 0 | 0 | 0 | 1 | 1 | 1 | 0 | 0 |
| 29400 | 0 | 1 | 0 | 0 | 0 | 1 | 1 | 1 | 1 | 0 |
| 29500 | 0 | 1 | 0 | 0 | 0 | 1 | 1 | 0 | 1 | 0 |
| 29600 | 0 | 1 | 0 | 0 | 0 | 1 | 1 | 0 | 1 | 1 |
| 29700 | 0 | 1 | 0 | 0 | 0 | 1 | 1 | 0 | 0 | 1 |
| 29800 | 0 | 1 | 0 | 0 | 0 | 0 | 1 | 0 | 0 | 1 |
| 29900 | 0 | 1 | 0 | 0 | 0 | 0 | 1 | 0 | 1 | 1 |
| 30000 | 0 | 1 | 0 | 0 | 0 | 0 | 1 | 0 | 1 | 0 |
| 30100 | 0 | 1 | 0 | 0 | 0 | 0 | 1 | 1 | 1 | 0 |
| 30200 | 0 | 1 | 0 | 0 | 0 | 0 | 1 | 1 | 0 | 0 |
| 30300 | 0 | 1 | 0 | 0 | 0 | 0 | 0 | 1 | 0 | 0 |
| 30400 | 0 | 1 | 0 | 0 | 0 | 0 | 0 | 1 | 1 | 0 |
| 30500 | 0 | 1 | 0 | 0 | 0 | 0 | 0 | 0 | 1 | 0 |
| 30600 | 0 | 1 | 0 | 0 | 0 | 0 | 0 | 0 | 1 | 1 |
| 30700 | 0 | 1 | 0 | 0 | 0 | 0 | 0 | 0 | 0 | 1 |
| 30800 | 1 | 1 | 0 | 0 | 0 | 0 | 0 | 0 | 0 | 1 |
| 30900 | 1 | 1 | 0 | 0 | 0 | 0 | 0 | 0 | 1 | 1 |
| 31000 | 1 | 1 | 0 | 0 | 0 | 0 | 0 | 0 | 1 | 0 |
| 31100 | 1 | 1 | 0 | 0 | 0 | 0 | 0 | 1 | 1 | 0 |
| 31200 | 1 | 1 | 0 | 0 | 0 | 0 | 0 | 1 | 0 | 0 |
| 31300 | 1 | 1 | 0 | 0 | 0 | 0 | 1 | 1 | 0 | 0 |
| 31400 | 1 | 1 | 0 | 0 | 0 | 0 | 1 | 1 | 1 | 0 |
| 31500 | 1 | 1 | 0 | 0 | 0 | 0 | 1 | 0 | 1 | 0 |
| 31600 | 1 | 1 | 0 | 0 | 0 | 0 | 1 | 0 | 1 | 1 |
| 31700 | 1 | 1 | 0 | 0 | 0 | 0 | 1 | 0 | 0 | 1 |
| 31800 | 1 | 1 | 0 | 0 | 0 | 1 | 1 | 0 | 0 | 1 |
| 31900 | 1 | 1 | 0 | 0 | 0 | 1 | 1 | 0 | 1 | 1 |
| 32000 | 1 | 1 | 0 | 0 | 0 | 1 | 1 | 0 | 1 | 0 |
| 32100 | 1 | 1 | 0 | 0 | 0 | 1 | 1 | 1 | 1 | 0 |
| 32200 | 1 | 1 | 0 | 0 | 0 | 1 | 1 | 1 | 0 | 0 |
| 32300 | 1 | 1 | 0 | 0 | 0 | 1 | 0 | 1 | 0 | 0 |
| 32400 | 1 | 1 | 0 | 0 | 0 | 1 | 0 | 1 | 1 | 0 |
| 32500 | 1 | 1 | 0 | 0 | 0 | 1 | 0 | 0 | 1 | 0 |
| 32600 | 1 | 1 | 0 | 0 | 0 | 1 | 0 | 0 | 1 | 1 |
| 32700 | 1 | 1 | 0 | 0 | 0 | 1 | 0 | 0 | 0 | 1 |
| 32800 | 1 | 1 | 0 | 0 | 1 | 1 | 0 | 0 | 0 | 1 |
| 32900 | 1 | 1 | 0 | 0 | 1 | 1 | 0 | 0 | 1 | 1 |
| 33000 | 1 | 1 | 0 | 0 | 1 | 1 | 0 | 0 | 1 | 0 |
| 33100 | 1 | 1 | 0 | 0 | 1 | 1 | 0 | 1 | 1 | 0 |
| 33200 | 1 | 1 | 0 | 0 | 1 | 1 | 0 | 1 | 0 | 0 |

TABLE 1-continued

Gillham Grey Code Chart

| Attitude | D4 | A1 | A2 | A4 | B1 | B2 | B4 | C1 | C2 | C4 |
|---|---|---|---|---|---|---|---|---|---|---|
| 33300 | 1 | 1 | 0 | 0 | 1 | 1 | 1 | 1 | 0 | 0 |
| 33400 | 1 | 1 | 0 | 0 | 1 | 1 | 1 | 1 | 1 | 0 |
| 33500 | 1 | 1 | 0 | 0 | 1 | 1 | 1 | 0 | 1 | 0 |
| 33600 | 1 | 1 | 0 | 0 | 1 | 1 | 1 | 0 | 1 | 1 |
| 33700 | 1 | 1 | 0 | 0 | 1 | 1 | 1 | 0 | 0 | 1 |
| 33800 | 1 | 1 | 0 | 0 | 1 | 0 | 1 | 0 | 0 | 1 |
| 33900 | 1 | 1 | 0 | 0 | 1 | 0 | 1 | 0 | 1 | 1 |
| 34000 | 1 | 1 | 0 | 0 | 1 | 0 | 1 | 0 | 1 | 0 |
| 34100 | 1 | 1 | 0 | 0 | 1 | 0 | 1 | 1 | 1 | 0 |
| 34200 | 1 | 1 | 0 | 0 | 1 | 0 | 1 | 1 | 0 | 0 |
| 34300 | 1 | 1 | 0 | 0 | 1 | 0 | 0 | 1 | 0 | 0 |
| 34400 | 1 | 1 | 0 | 0 | 1 | 0 | 0 | 1 | 1 | 0 |
| 34500 | 1 | 1 | 0 | 0 | 1 | 0 | 0 | 0 | 1 | 0 |
| 34600 | 1 | 1 | 0 | 0 | 1 | 0 | 0 | 0 | 1 | 1 |
| 34700 | 1 | 1 | 0 | 0 | 1 | 0 | 0 | 0 | 0 | 1 |
| 34800 | 1 | 1 | 0 | 1 | 1 | 0 | 0 | 0 | 0 | 1 |
| 34900 | 1 | 1 | 0 | 1 | 1 | 0 | 0 | 0 | 1 | 1 |
| 35000 | 1 | 1 | 0 | 1 | 1 | 0 | 0 | 0 | 1 | 0 |

What is claimed is:

1. An apparatus for detecting faults in aircraft altimetry comprising:
   (a) a first logic having:
      (i) an input coupled to receive a Gray-coded altitude; and
      (ii) error logic to detect an error in said Gray-coded altitude;
      (iii) an output for asserting a first error signal when said error is detected;
   (b) a second logic having;
      (i) an input coupled to receive a pressure altitude data and a secondary source of altitude data;
      (ii) altitude rate logic to compare a first rate of change of said pressure altitude data and a second rate of change of said secondary source of altitude data; and
      (iii) an output for asserting a second error signal when said first and second rate of change differ by more than a predetermined amount;
   (c) a third logic having:
      (i) an input coupled to receive said pressure altitude data and a tertiary source of altitude data;
      (ii) a comparison logic to obtain a difference between said pressure altitude and said tertiary source of altitude data;
      (iii) a error budget logic that obtains an error budget based on known characteristics of said pressure altitude data and said tertiary source of altitude data;
      (iv) an output for asserting a third error signal when said difference exceeds said error budget; and
   (d) an alerting logic having:
      (i) an input coupled to receive said first error signal, said second error signal and said third error signal; and
      (ii) an output for asserting an alert signal when at least one of said first error signal, said second error signal and said third error signal is asserted.

2. The apparatus of claim 1 wherein said tertiary source of altitude data and said secondary source of altitude data comprise data received from the same sensor.

3. The apparatus of claim 1 wherein said alert signal includes a signal to control an aural alert.

4. The apparatus of claim 1 wherein said alert signal includes a signal to control a visual alert.

5. The apparatus of claim 1 wherein said alerting device further comprises a second output for asserting an altimetry valid signal when each of said first error signal, said second error signal and said third error signal are deasserted.

6. The apparatus of claim 1 wherein said secondary source of altitude data comprises altitude data received from a satellite based navigation system.

7. The apparatus of claim 6 wherein said satellite based navigation system comprises a global positioning system.

8. The apparatus of claim 1 wherein said error budget accounts for errors due to nonstandard atmospheric conditions.

9. The apparatus of claim 1 wherein said error budget accounts for errors due to differences between pressure altitude data and geometric altitude data based on a predetermined model atmosphere.

10. The apparatus of claim 1 wherein said error budget accounts for errors due to operational inaccuracies in said tertiary source of altitude data.

11. The apparatus of claim 1 further including a means to enable said apparatus.

12. The apparatus of claim 1 wherein said alert signal is configurable.

13. The apparatus of claim 1 wherein said apparatus comprises an Enhanced Ground Proximity Warning System computer.

14. The apparatus of claim 1 wherein said tertiary source of altitude data comprises an altitude calibrated from a terrain data base.

15. An apparatus for detecting errors in Gray-coded altitude comprising:
   a first logic for comparing a current Gray-coded altitude to a previously sampled Gray-coded altitude and for asserting a first signal when said current code and said previously sampled code are not identical and for obtaining a difference between said current code and said previously sampled code;
   a second logic for comparing said difference to a first predefined error condition and asserting a first error signal when said difference matches said predefined error condition and when said first signal is asserted;
   a third logic for comparing bits C1, C2, C4 of said current code to a predetermined set of invalid bit sequences and for asserting a second error signal when said current code matches at least one of said invalid bit sequences; and
   an output for asserting a Gray-coded altitude error signal when at least one of said first error signal or said second error signal is asserted.

16. The apparatus of claim 15 wherein said output further includes a device for verifying a given state of said Gillham altitude error signal exists for a specified period before outputting said Gillham altitude error signal.

17. The apparatus of claim 15 wherein said apparatus is enabled when said aircraft is airborne.

18. The apparatus of claim 15 wherein said apparatus comprises a computer processor with executable code.

19. The apparatus of claim 15 wherein said apparatus comprises an aircraft transponder.

20. The apparatus of claim 15 wherein said apparatus comprises an Enhanced Ground Proximity Warning System computer.

21. The apparatus of claim 15 wherein said apparatus comprises a Traffic Collision and Avoidance System computer.

22. An apparatus for detecting errors in aircraft altimetry comprising:
   an input for receiving a first and second source of altitude data;

a first logic to obtain a difference in a rate of change of each of said first and second sources of altitude data; and a second logic for comparing said difference to a predetermined value and for asserting an altimetry error signal when said difference exceeds said predetermined value.

23. The apparatus of claim 22 wherein said second logic further comprises a track hold logic for outputting said altimetry error signal only when said altimetry error signal has been asserted for a predefined period.

24. The apparatus of claim 22 wherein said apparatus comprises an Enhanced Ground Proximity Warning System computer.

25. The apparatus of claim 22 wherein said apparatus comprises a Traffic Collision and Avoidance System computer.

26. The apparatus of claim 22 wherein said apparatus comprises a transponder.

27. An apparatus for detecting errors in aircraft pressure altitude measurements comprising:

an input for receiving a pressure altitude data and a geometric altitude data;

a first logic for obtaining a difference between said pressure altitude data and said geometric altitude data;

a second logic for defining a first probable error between said geometric altitude data and said pressure altitude data based on a standard atmosphere;

a third logic for defining a second probable error due to deviations from nonstandard atmospheric conditions; and a fourth logic for comparing a sum of said first and second probable errors to said difference and asserting a pressure altitude error signal when said difference exceeds said sum.

28. The apparatus of claim 27 wherein said sum additionally includes a third error term defining a third probable error in measurement of said geometric altitude.

29. The apparatus of claim 27 wherein said geometric altitude data additionally includes geometric altitude data obtained from a terrain data base.

30. The apparatus of claim 27 wherein said fourth logic comprises a track hold logic for outputting said altimetry error signal only when said pressure altitude error signal has been asserted for a predefined period.

31. The apparatus of claim 27 wherein said apparatus comprises an Enhanced Ground Proximity Warning System computer.

32. The apparatus of claim 27 wherein said apparatus comprises a Traffic Collision and Avoidance System computer.

33. The apparatus of claim 27 wherein said apparatus comprises a transponder.

34. The apparatus of claim 27 further comprising a switch for using a first source of geometric altitude data when airborne and a second source of geometric altitude data when on the ground.

35. The apparatus of claim 34 wherein said first source of geometric altitude data comprises geometric altitude data from a satellite based navigation system.

36. The apparatus of claim 35 wherein said satellite based navigation system comprises a global positioning system.

37. The apparatus of claim 34 wherein said second source of geometric altitude data comprises data from a terrain data base.

38. A method for detecting errors in Gray-coded altitude comprising the steps of:

comparing a current Gray-coded altitude to a previously sampled Gray-coded altitude and asserting a first signal when said current code and said previously sampled code are not identical;

obtaining a difference between said current code and said previously sampled code;

comparing said difference to a first predefined error condition and asserting a first error signal when said difference matches said predefined error condition and when said first signal is asserted;

comparing specified bit positions of said current code to a predetermined set of invalid bit sequences for said bit positions;

asserting a second error signal when said current code matches at least one of said invalid bit sequences; and asserting an altitude error signal when at least one of said first error signal or said second error signal is asserted.

39. The method of claim 38 further comprising the step of providing an alert to a cockpit crew when said altitude error signal is asserted.

40. The method of claim 39 wherein said step of providing an alert comprises the step of providing a visual alert.

41. The method of claim 39 wherein said step of providing an alert comprises the step of providing an aural alert.

42. The method of claim 38 further comprising the step of providing an alert to an aircraft system utilizing the Gray-coded altitude when said Gray-coded altitude error signal is asserted.

43. The method of claim 42 wherein said step of providing an alert comprises the step of deasserting an altimetry valid signal.

44. A method for detecting errors in altimetry comprising the steps of:

obtaining a difference in a rate of change of each of a first and a second sources of altitude data; and comparing said difference to a predetermined value; and asserting an altimetry error signal when said difference exceeds said predetermined value.

45. The method of claim 44 further comprising the step of providing an alert to a cockpit crew when said altimetry error signal is asserted.

46. The method of claim 45 wherein said step of providing an alert comprises the step of providing a visual alert.

47. The method of claim 45 wherein said step of providing an alert comprises the step of providing an aural alert.

48. The method of claim 44 further comprising the step of providing an alert to an aircraft system utilizing the altimetry when said altimetry error signal is asserted.

49. The method of claim 48 wherein said step of providing an alert comprises the step of deasserting an altimetry valid signal.

50. A method for detecting errors in altimetry comprising the steps of:

obtaining a difference between a pressure altitude data and a geometric altitude data;

defining a first probable error between said geometric altitude data and said pressure altitude data based on a standard atmosphere;

defining a second probable error due to deviations from nonstandard atmospheric conditions; and comparing a sum of said first and said second probable errors to said difference and asserting a pressure altitude error signal when said difference exceeds said sum.

51. The method of claim 50 wherein said step of comparing a sum further comprises the step of adding to said sun, a third probable error resulting from measurement of said geometric altitude.

52. The method of claim 50 further comprising the step of obtaining said geometric altitude data from a terrain data base.

53. The method of claim 50 further comprising the step of providing an alert to a cockpit crew when said pressure altitude error signal is asserted.

54. The method of claim 53 wherein said step of providing an alert comprises the step of providing a visual alert.

55. The method of claim 53 wherein said step of providing an alert comprises the step of providing an aural alert.

56. The method of claim 50 further comprising the step of providing an alert to an aircraft system utilizing the altimetry when said altimetry error signal is asserted.

57. The method of claim 56 wherein said step of providing an alert comprises the step of deasserting an altimetry valid signal.

58. A computer program for detecting Gray-coded altitude errors comprising:
  a computer readable storage medium having computer readable program code means embodied in said medium, said computer readable program code means having:
    first computer instruction means for comparing a current Gray-coded altitude to a previously sampled Gray-coded altitude and asserting a signal when said current code and said previously sampled code are not identical;
    second computer instruction means for comparing said current code to said previously sampled code to obtain a difference;
    third computer instruction means for comparing said difference to a predefined error condition and asserting a first error signal when said difference matches said error condition and said first signal is asserted;
    fourth computer instruction means for comparing specified bit positions of said current code to a predetermined set of invalid bit sequences for said bit positions;
    fifth computer instruction means for asserting a second error signal when said specified bit positions match at least one of said predetermined set of invalid bit sequences; and
    sixth computer instruction means for asserting an altitude error signal when at least one of said first error signal or said second error signal is asserted.

59. The computer program product of claim 58 further comprising a seventh computer instruction means for providing an alert to a cockpit crew when said altitude error signal is asserted.

60. The computer program product of claim 58 further comprising a seventh computer instruction means for providing an alert to an aircraft system utilizing the Gray-coded altitude when said altitude error signal is asserted.

61. A computer program product for detecting errors in altimetry comprising:
  a computer readable storage medium having computer readable program code means embodied in said medium, said computer readable program code means having:
    first computer instruction means for accessing a first source of altitude data and a second source of altitude data;
    second computer instruction means for obtaining a difference in a rate of change of said first source of altitude data and a rate of change in said second source of altitude data;
    third computer instruction means for comparing said difference to a predetermined value; and
    fourth computer instruction means for asserting an altimetry error signal when said difference exceeds said predetermined value.

62. The computer program product of claim 61 further comprising a fifth computer instruction means for providing an alert to a cockpit crew when said altimetry error signal is asserted.

63. The computer program product of claim 61 further comprising a fifth computer instruction means for providing an alert to an aircraft system utilizing the altimetry when said altimetry error signal is asserted.

64. A computer program product for detecting errors in altimetry comprising:
  a computer readable storage medium having computer readable program code means embodied in said medium said computer readable program code means having:
    first computer instruction means for accessing a pressure altitude data and a geometric altitude data;
    second computer instruction means for obtaining a difference between said pressure altitude data and said geometric altitude data;
    third computer instruction means for defining a first probable error between said geometric altitude data and said pressure altitude data;
    fourth computer instruction means for defining a second probable error due to deviations from a standard atmosphere; and
    fifth computer instruction means for comparing a sum of said first and second probable errors to said difference and asserting a pressure altitude error signal when said difference exceeds said sum.

65. The computer program product of claim 64 further comprising:
  sixth computer instruction means for defining a third probable error resulting from measurement of geometric altitude; and
  wherein said fifth computer instruction means includes said third probable error in said sum.

66. The computer program product of claim 64 further comprising a sixth computer instruction means for providing an alert to a cockpit crew when said pressure altitude error signal is asserted.

67. The computer program product of claim 64 further comprising a sixth computer instruction means for providing an alert to an aircraft system utilizing the altimetry when said pressure altitude error signal is asserted.

68. The computer program product of claim 64 wherein said first computer instruction means accesses said geometric altitude data from a terrain data base.

69. The apparatus of claim 15 wherein said apparatus comprises a flight management system computer.

70. The apparatus of claim 22 wherein said apparatus comprises a flight management system computer.

71. The apparatus of claim 27 wherein said apparatus comprises a flight management system computer.

72. The apparatus of claim 1, wherein the gray altitude code is Gillham-coded altitude.

73. The apparatus of claim 15, wherein the gray altitude code is Gillham-coded altitude.

74. The apparatus of claim 22, wherein the altitude data from at least one of the first and second sources is Gillham-coded.

75. The method of claim 42, wherein the gray altitude code is Gillham-coded altitude.

76. The product of claim 60, wherein the gray altitude code is Gillham-coded altitude.

* * * * *